(12) United States Patent
Bickham

(10) Patent No.: US 12,197,000 B2
(45) Date of Patent: Jan. 14, 2025

(54) REDUCED CLAD DUAL-CORE OPTICAL FIBERS FOR OPTICAL FIBER CABLES AND OPTICAL FIBER INTERCONNECTS

(71) Applicant: CORNING INCORPORATED, Corning, NY (US)

(72) Inventor: Scott Robertson Bickham, Corning, NY (US)

(73) Assignee: Corning Incorporated, Corning, NY (US)

( * ) Notice: Subject to any disclaimer, the term of this patent is extended or adjusted under 35 U.S.C. 154(b) by 262 days.

(21) Appl. No.: 17/981,760

(22) Filed: Nov. 7, 2022

(65) Prior Publication Data

US 2023/0152513 A1   May 18, 2023

Related U.S. Application Data

(60) Provisional application No. 63/278,745, filed on Nov. 12, 2021.

(51) Int. Cl.
| | | |
|---|---|---|
| *G02B 6/02* | (2006.01) | |
| *G02B 6/028* | (2006.01) | |
| *G02B 6/036* | (2006.01) | |
| *G02B 6/38* | (2006.01) | |
| *G02B 6/44* | (2006.01) | |

(52) U.S. Cl.
CPC ....... *G02B 6/02042* (2013.01); *G02B 6/0281* (2013.01); *G02B 6/3885* (2013.01); *G02B 6/4403* (2013.01); *G02B 6/02395* (2013.01); *G02B 6/03627* (2013.01)

(58) Field of Classification Search
CPC ............ G02B 6/02042; G02B 6/02395; G02B 6/0281; G02B 6/03627; G02B 6/3885; G02B 6/4403
See application file for complete search history.

(56) References Cited

U.S. PATENT DOCUMENTS

2021/0294024 A1    9/2021  Li et al.

FOREIGN PATENT DOCUMENTS

| CA | 3065175 A1 | 7/2020 |
| CN | 113376731 A * | 9/2021 |

OTHER PUBLICATIONS

Yuan et al, Translation of CN 113376731A, Sep. 10, 2021. (Year: 2021).*

(Continued)

*Primary Examiner* — Ryan A Lepisto
(74) *Attorney, Agent, or Firm* — Kevin L. Bray

(57) ABSTRACT

A dual-core optical fiber include a first waveguide comprising a first core longitudinal centreline and a second waveguide comprising a second core longitudinal centreline. The first and second waveguides extend through a common cladding through comprising a longitudinal centerline and an outer radius $R_4$ that is less than or equal to 45 μm. The first core longitudinal centerline and the second core longitudinal centerline are separated from one another by a waveguide-to-waveguide separation distance that is greater than or equal to 30 μm. A cross-talk between the first and second waveguides is less than or equal to −40 dB at 1310 nm, as measured over a length of 100 km of the dual-core optical fiber.

23 Claims, 10 Drawing Sheets

(56) References Cited

OTHER PUBLICATIONS

International Search Report and Written Opinion of the International Searching Authority; PCT/US2022/048179; dated Jan. 27, 2023; 15 pages; European Patent Office.
OFS Company: "200-Micron Single-Mode Fiber Enables New Cable Designs", Retrieved from: https://fiber-optic-catalog.ofsoptics.com/documents/pdf/200-Micron-Fiber-Enables-New-Cable-Designs.pdf, 2014, 7 pages.

\* cited by examiner

REDUCED CLAD DUAL-CORE OPTICAL FIBERS FOR OPTICAL FIBER CABLES AND OPTICAL FIBER INTERCONNECTS

This application claims the benefit of priority under 35 U.S.C § 120 of U.S. Provisional Application Ser. No. 63/278,745 filed on Nov. 12, 2021, the content of which is relied upon and incorporated herein by reference in its entirety.

FIELD

The present specification generally relates to dual-core optical fibers and fiber optic cables and interconnects made therefrom.

TECHNICAL BACKGROUND

The push for higher data rates in digital communications has driven the integration of optics with electronics. In particular, the use of silicon photonics for electro-optical transceivers has resulted in very dense optical circuitry concentrating many separate optical signal lines into one photonic chip. For optical signal transmission over large distances, the optical signals need to be coupled into optical fibers.

A standard geometry for optical fibers is a glass diameter of 125 micrometers and a coating diameter of 250 micrometers. This standard geometry is well-suited for connections between optical fiber cables and between an optical fiber cable and relatively large telecommunication devices. However, the standard geometry is relatively large for chip-scale interconnections and severely restricts the maximum density of optical input and output connections for photonic chips. Efforts have been made to increase core density using standard geometry fibers by utilizing multicore optical fibers. For example, multicore optical fibers of the standard geometry described above including four cores have been proposed as a way to increase core density while still providing the desired $2^n$ transmission paths. Producing such fibers, however, has proven to be inefficient and costly.

SUMMARY

Aspect 1: A dual-core optical fiber comprising: a first waveguide comprising a first core longitudinal centerline; a second waveguide comprising a second core longitudinal centerline; and a common cladding through which the first and second waveguides extend, the common cladding comprising a longitudinal centerline and an outer radius $R_4$ that is less than or equal to 45 μm, wherein: the first core longitudinal centerline and the second core longitudinal centerline are separated from one another by a waveguide-to-waveguide separation distance that is greater than or equal to 30 μm, and a cross-talk between the first and second waveguides is less than or equal to −40 dB at 1310 nm, as measured over a length of 100 km of the dual-core optical fiber.

Aspect 2: The dual-core optical fiber of Aspect 1, wherein: the first waveguide and the second waveguide each comprise a core region comprising a radius $r_1$, a relative refractive index $\Delta_1$, and an alpha value, and at least one of the first waveguide and the second waveguide comprises a depressed cladding region comprising a radius $r_3$ and a relative refractive index $\Delta_3$ circumferentially surrounding the core region.

Aspect 3: The dual-core optical fiber of any of Aspects 1-2, wherein the alpha value of each of the first waveguide and the second waveguide is between 6 and 12.

Aspect 4: The dual-core optical fiber of any of Aspects 1-3, wherein the radius $r_3$ of the depressed cladding region of the at least one of the first waveguide and the second waveguide is less than or equal to $0.9*R_4/2$.

Aspect 5: The dual-core optical fiber of any of Aspects 1-4, wherein the radius $r_3$ of the depressed cladding region of the at least one of the first waveguide and the second waveguide is less than or equal to $0.8*R_4/2$.

Aspect 6: The dual-core optical fiber of any of Aspects 1-5, wherein the depressed cladding region of the at least one of the first waveguide and the second waveguide comprises a trench volume that is greater than or equal to −70%μm² and less than or equal to −30%μm².

Aspect 7: The dual-core optical fiber of any of Aspects 1-6, wherein the relative refractive index $\Delta_1$ of the core region of each of the first waveguide and the second waveguide comprises a maximum value $\Delta_{1max}$ that is greater than or equal to 0.32 Δ% and less than or equal to 0.36 Δ%.

Aspect 8: The dual-core optical fiber of any of Aspects 1-7, wherein the first waveguide and the second waveguide each comprise an inner cladding region circumferentially surrounding and contacting the core region, the inner cladding region comprising a radius $r_2$ and a relative refractive index $\Delta_2$ that is greater than or equal to −0.05 Δ% and less than or equal to 0.05 Δ%, and wherein the first waveguide comprises the depressed cladding region, the depressed cladding region of the first waveguide circumferentially surrounding and contacting the inner cladding region of the first waveguide.

Aspect 9: The dual-core optical fiber of any of Aspects 1-8, wherein the second waveguide comprises the depressed cladding region, the depressed cladding region of the second waveguide circumferentially surrounding and contacting the inner cladding region of the second waveguide.

Aspect 10: The dual-core optical fiber of any of Aspects 1-9, wherein: the radius $r_1$ of the core region of each of the first waveguide and the second waveguide is greater than or equal to 4 μm and less than or equal to 5 μm; and a radial thickness $t_2$ of the inner cladding region of each of the first waveguide and the second waveguide is greater than or equal to 6 μm and less than or equal to 10 μm.

Aspect 11: The dual-core optical fiber of any of Aspects 1-10, wherein the depressed cladding region of at least one of the first waveguide and the second waveguide comprises a radial thickness $t_3$ that is greater than or equal to 2 μm and less than or equal to 6 μm.

Aspect 12: The dual-core optical fiber of any of Aspects 1-11, wherein the alpha value of each of the first waveguide and the second waveguide is less than or equal to 6.

Aspect 13: The dual-core optical fiber of any of Aspects 1-12, wherein the relative refractive index $\Delta_1$ of the core region of each of the first waveguide and the second waveguide comprises a maximum value $\Delta_{1max}$ that is greater than or equal to 0.36 Δ% and less than or equal to 0.4 Δ%.

Aspect 14: The dual-core optical fiber of any of Aspects 1-13, wherein the first waveguide and the second waveguide each comprise an inner cladding region circumferentially surrounding and contacting the core region, the inner cladding region comprising a radius $r_2$ and a relative refractive index $\Delta_2$ that is greater than or equal to −0.05 Δ% and less than or equal to 0.05 Δ%; and wherein the first waveguide comprises the depressed cladding region, the depressed cladding region of the first waveguide circumferentially surrounding and contacting the inner cladding region of the first waveguide.

Aspect 15: The dual-core optical fiber of any of Aspects 1-14, wherein the second waveguide comprises the depressed cladding region, the depressed cladding region of the second waveguide circumferentially surrounding and contacting the inner cladding region of the second waveguide.

Aspect 16: The dual-core optical fiber of any of Aspects 1-15, wherein: the radius $r_1$ of the core region of each of the first waveguide and the second waveguide is greater than or equal to 4.8 µm and less than or equal to 5.8 µm; and a radial thickness $t_2$ of the inner cladding region of each of the first waveguide and the second waveguide is greater than or equal to 6 µm and less than or equal to 10 µm.

Aspect 17: The dual-core optical fiber of any of Aspects 1-16, wherein the depressed cladding region comprises a trench volume that is greater than or equal to $-70\%\mu m^2$ and less than or equal to $-30\%\mu m^2$.

Aspect 18: The dual-core optical fiber of any of Aspects 1-17, wherein the first waveguide and the second waveguide comprise mode field diameters at 1310 nm that are greater than or equal to 8.6 µm and less than or equal to 9.5 µm.

Aspect 19: The dual-core optical fiber of any of Aspects 1-18, wherein the first waveguide and the second waveguide comprise zero dispersion wavelengths that are greater than or equal to 1300 nm and less than or equal to 1324 nm.

Aspect 20: The dual-core optical fiber of any of Aspects 1-19, further comprising an inner coating circumferentially surrounding and contacting the common cladding and an outer coating circumferentially surrounding and contacting the inner coating, wherein the outer coating comprises a radius $R_6$ that is less than or equal to 82.5 µm.

Aspect 21: The dual-core optical fiber of any of Aspects 1-20, wherein the waveguide-to-waveguide separation distance is greater than or equal to 30 µm and less than or equal to 45 µm.

Aspect 22: The dual-core optical fiber of any of Aspects 1-21, wherein only one of the first waveguide and the second waveguide comprises a depressed cladding region with a relative refractive index $\Delta_3$ that is less than a relative refractive index $\Delta_4$ of the common cladding.

Aspect 23: An optical fiber cable comprising: a plurality of dual-core optical fibers arranged in one or more rows, wherein each dual-core optical fiber comprises: a glass portion comprising a common cladding through which a first waveguide and a second waveguide extend, the common cladding having a longitudinal centerline and a radius $R_4$ that is less than or equal to 45 µm, the first waveguide comprising a core region and a first core longitudinal centerline, the second waveguide comprising a core region and a second core longitudinal centerline, wherein the first core longitudinal centerline and the second core longitudinal centerline are separated from one another by a waveguide-to-waveguide separation distance that is greater than or equal to 30 µm; and a coating portion that surrounds and contacts the glass portion and comprises a radius $R_6$ that is less than or equal to 82.5 µm; and a matrix layer encapsulating the plurality of dual-core optical fibers, wherein: the plurality of dual-core optical fibers are arranged such that the longitudinal centerlines of the common cladding of each of the plurality of dual-core optical fibers are separated by a pitch PR that is less than or equal to 175 µm; and a cross-talk between the first and second waveguides in each of the plurality of dual core optical fibers is less than or equal to 40 dB at 1310 nm, as measured over a length of 100 km of the dual-core optical fiber.

Aspect 24: The optical fiber cable of Aspect 23, wherein the one or more rows comprises a single row.

Aspect 25: The optical fiber cable of any of Aspects 23-24, wherein each of the one or more rows comprises multiples of four of the dual-core optical fibers.

Aspect 26: The optical fiber cable of any of Aspects 23-25, wherein the centerlines of the common cladding of each of the plurality of dual-core optical fibers in each of the one or more rows are separated by a pitch PR that is less than or equal to 165 µm.

Aspect 27: The optical fiber cable of any of Aspects 23-26, wherein at least one of the first waveguide and the second waveguide in each of the plurality of dual core optical fibers comprises a depressed cladding region comprising a radius $r_3$ and a relative refractive index $\Delta_3$, the depressed cladding region circumferentially surrounding the core region of the at least one of the first waveguide and the second waveguide.

Aspect 28: The optical fiber cable of any of Aspects 23-27, wherein the radius $r_3$ of the depressed cladding region of the at least one of the first waveguide and the second waveguide in each of the plurality of dual core optical fibers is less than or equal to $0.9*R_4/2$.

Aspect 29: The optical fiber cable of any of Aspects 23-28, wherein the radius $r_3$ of the depressed cladding region of the at least one of the first waveguide and the second waveguide in each of the plurality of dual core optical fibers is less than or equal to $0.8*R_4/2$.

Aspect 30: The optical fiber cable of any of Aspects 23-29, wherein the depressed cladding region of the at least one of the first waveguide and the second waveguide in each of the plurality of dual core optical fibers comprises a trench volume that is greater than or equal to $-70\% \mu m^2$ and less than or equal to $-30\% \mu m^2$.

Aspect 31: An optical fiber interconnect comprising: an optical fiber ribbon cable comprising a first end, a second end, and at least one fiber ribbon comprising a plurality of dual-core optical fibers, wherein each dual-core optical fiber comprises: a glass portion comprising a common cladding with a radius $R_4$ that is less than or equal to 42 µm, a first waveguide comprising a first core longitudinal centerline, and a second waveguide comprising a second core longitudinal centerline, wherein the first core longitudinal centerline and the second core longitudinal centerline are separated from one another by a waveguide-to-waveguide separation distance that is less than or equal to 36 µm; and a coating portion that surrounds and contacts the glass portion and comprises a radius $R_6$ that is less than or equal to 82.5 µm; and an optical fiber connector disposed at the first end or the second end, wherein: within the optical fiber connector, the plurality of dual-core optical fibers is arranged in one or more rows with a pitch P that is less than or equal to 165 µm.

Aspect 32: The optical fiber interconnect of Aspect 31, wherein the optical fiber connector comprises a first connector disposed at the first end, the first connector comprising a ferrule with a plurality of holes extending therethrough, each of the plurality of holes containing one of the plurality of dual-core optical fibers.

Aspect 33: The optical fiber interconnect of any of Aspects 31-32, wherein each of the plurality of holes comprises a hole centerline and a radius $R_H$ that is greater than or equal to $R_4$ and less than or equal to $R_6$.

Aspect 34: The optical fiber interconnect of any of Aspects 31-33, wherein a spacing between edges of adjacent ones of the plurality of holes is greater than or equal to $2*R_H$ and less than or equal to $4*R_H$.

Aspect 35: The optical fiber interconnect of any of Aspects 31-34, wherein the optical fiber connector comprises a second connector disposed at the second end, the second connector comprising a grooved substrate comprising a planar top surface comprising a plurality of grooves, wherein: each of the plurality of grooves contains at least the glass portion of one of the plurality of dual-core-optical fibers, the plurality of grooves are arranged with a center-to-center spacing P2 corresponding to the pitch P, and waveguides of the plurality of dual-core optical fibers are arranged in the plurality of grooves with a linear core density of greater than 10 waveguides/mm.

Aspect 36: The optical fiber interconnect of any of Aspects 31-35, wherein: the at least one fiber ribbon comprises a first fiber ribbon and a second fiber ribbon, each of the first fiber ribbon and the second fiber ribbon comprising a plurality of the plurality of dual-core optical fibers, the dual-core optical fibers of the first and second fiber ribbons are arranged therein with a pitch PR that is less than or equal to 165 μm, ends of the glass portions of the dual-core optical fibers of each of the first and second fiber ribbons extend longitudinally beyond the coating portion of the dual-core optical fibers, and the ends are interleaved in the plurality of grooves.

Aspect 37: The optical fiber interconnect of any of Aspects 31-36, wherein the pitch P is less than or equal to 0.6*PR.

Aspect 38: The optical fiber interconnect of any of Aspects 31-37, wherein the pitch P is greater than or equal to 80 μm and less than or equal to 85 μm.

BRIEF DESCRIPTION OF THE DRAWINGS

The embodiments set forth in the drawings are illustrative and exemplary in nature and not intended to limit the subject matter defined by the claims. The following detailed description of the illustrative embodiments can be understood when read in conjunction with the following drawings, where like structure is indicated with like reference numerals and in which:

DETAILED DESCRIPTION

Figure 1:
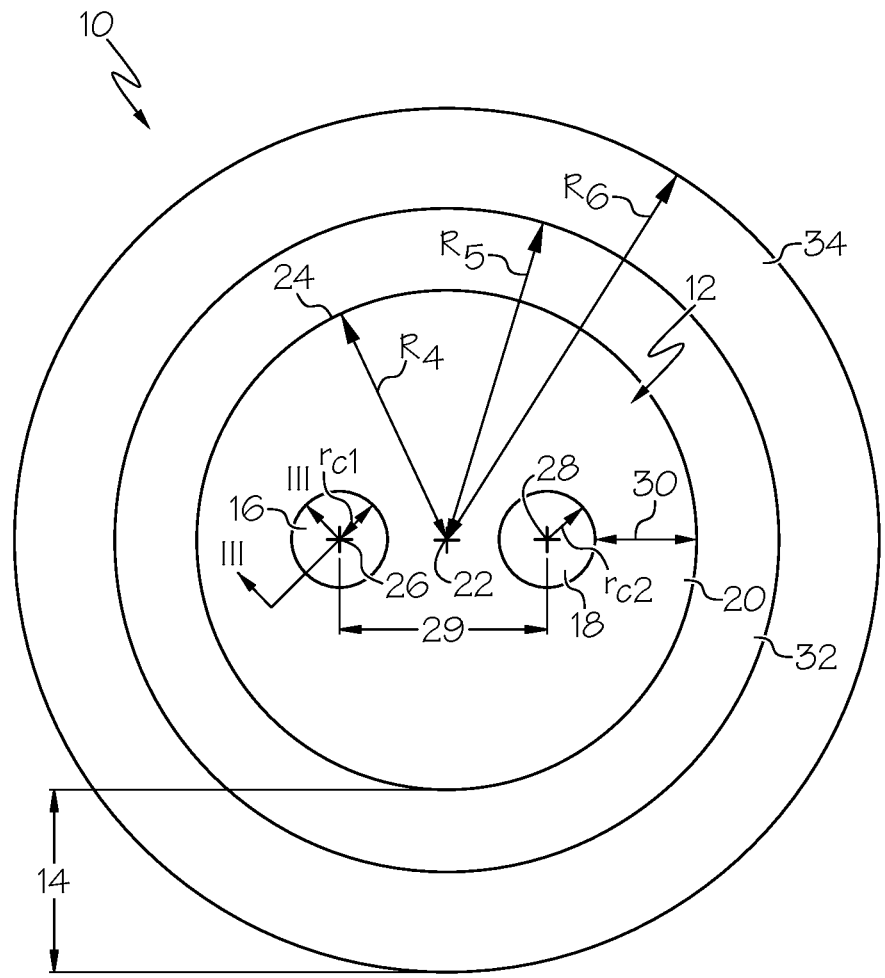
FIG. 1 schematically depicts a cross-sectional view of a dual-core optical fiber, according to one or more embodiments described herein.

Reference will now be made in detail to embodiments of reduced-cladding dual-core optical fibers with relatively low cross-talk and optical fiber cables and interconnects including the same. The dual-core optical fibers include at least two waveguides. Each waveguide includes a core region and optionally one or more cladding regions that circumferentially surround the core region. A common cladding circumferentially surrounds the waveguides. The core region has a higher refractive index than the common cladding and a higher refractive index than any of the optional circumferentially surrounding cladding regions. The waveguides are also referred to herein as "core portions".

The dual-core optical fibers described herein may comprise a glass portion and a coating portion circumferentially surrounding the glass portion. The glass portion may comprise a first waveguide comprising a first core longitudinal centerline and a second waveguide comprising a second core longitudinal centerline. The first and second waveguides may extend through a common cladding comprising an outer surface defining a radius $R_4$ of the glass portion. In embodiments, the first and second waveguides are symmetrically arranged on opposing sides of a longitudinal centerline of the dual-core optical fiber (or a centerline of the common cladding). The first and second core longitudinal centerlines may be separated from one another by a waveguide-to-waveguide separation distance that is greater than or equal to 30 μm such that the cross-talk between the waveguides at 1310 μm may be less than or equal to −30 dB, as measured over a length of 100 km of fiber. The radius $R_4$ defined by the outer surface of the common cladding may be less than or equal to 55 μm, representing a decrease as compared to certain existing multicore optical fibers, which may include a common cladding with a radius of 62.5 μm. The combination of the reduced cladding size and waveguide-to-waveguide separation distance of the dual-core fibers described herein beneficially provides relatively high core densities as compared to conventional 125/250 μm single mode fibers. For example, in embodiments, the coating portions of the dual-core fibers described herein may be approximately 165 μm in diameter. Such a configuration provides a significant improvement in core density for various optical fiber cable configurations as compared with existing 125/250 μm single mode fibers. For example, when 16 optical fibers are arranged in a cylindrical-shaped optical fiber cable, the dual-core optical fibers described herein may provide a core density of greater than 5 waveguides/mm², representing more than twice the core density achieved using existing 125/250 μm single mode fibers, which provide a core density of approximately 2 waveguides/mm². As a result of this improvement in core density, the dual-core optical fibers described herein also facilitate optical fiber connectors (e.g., fiber array units MTO/MTP connectors) with reduced fiber pitches as compared to when existing 125/250 μm single mode fibers are used, facilitating denser interconnection between network components.

In embodiments, the first and second waveguides of the dual-core optical fibers described herein comprise relative refractive index profiles that may be designed such that cross talk between the first and second waveguides is less than or equal to −20 dB at wavelengths of 1310 nm, 1490 nm, and 1550 nm, as measured over a 100 km length of fiber. In embodiments, the cross-talk between the first and second waveguides is less than or equal to −30 dB (e.g., less than or equal to −40 dB, less than or equal to −45 dB, less than or equal to −50 dB) at 1310 nm, as measured over a 100 km length of fiber. Such low cross-talk may be achieved by incorporating an inner cladding region and a depressed cladding region into one or more of the first and second waveguides. In such embodiments, the core region, inner cladding region and depressed cladding region together comprise a waveguide. The inner cladding region and depressed cladding region of a waveguide circumferentially surround the core region of the waveguide. For example, in embodiments, the first waveguide comprises a first core region, a first inner cladding region circumferentially surrounding and contacting the first core region, and a first depressed cladding region circumferentially surrounding and contacting the first inner cladding region such that the first depressed cladding region is disposed between the first inner cladding region and the common cladding of the dual-core optical fiber. The depressed cladding region is a region having a lower relative refractive index than the inner cladding region and the core region. The depressed cladding region may also have a lower relative refractive index than the common cladding. Incorporation of the depressed cladding region may also beneficially reduce bending loss of the dual-core optical fibers described herein. The dual-core optical fibers described herein may only include a single depressed cladding region (e.g., surrounding a core region of only one of the waveguides) to facilitate a relatively small waveguide-to-waveguide separation distance of less than or equal to 45 μm, while still inhibiting cross-talk.

The expression "A/B μm" such as "125/250 μm" or "80/165 μm" is shorthand notation to describe the configuration of an optical fiber, where A is the diameter of the glass portion (i.e. the outer diameter of the common cladding) of the optical fiber in microns and B is the diameter of the coated optical fiber (i.e., the diameter of the outermost coating that circumferentially surrounds the glass portion) in microns.

"Radial position" and "radial distance" when used in reference to the radial coordinate "r" refer to radial position relative to the centerline (r=0) of each individual core region in a dual-core optical fiber. "Radial position" and "radial distance" when used in reference to the radial coordinate "R" refer to radial position relative to the centerline (R=0) of the dual-core optical fiber.

As used herein, radial position $r_1$ and relative refractive index $\Delta_1$ or $\Delta_1(r)$ refer to a core region of a waveguide, radial position $r_2$ and relative refractive index $\Delta_2$ or $\Delta_2(r)$ refer to an inner cladding region of a waveguide, radial position $r_3$ and relative refractive index $\Delta_3$ or $\Delta_3(r)$ refer to a depressed cladding region of a waveguide, and radial position $R_4$ and relative refractive index $\Delta_4$ or $\Delta_4(R)$ refer to a common cladding. Radial positions $R_5$ and $R_6$ refer to inner and outer coatings, respectively, that circumferentially surround a common cladding. Each radial position $r_i$ (i=1, 2, 3) and $R_i$ (i=4, 5, 6) refers to the outer radius of the region associated with the value i. For example, $r_1$ refers to the outer radius of a core region of a waveguide, $r_2$ refers to the outer radius of an inner cladding region of a waveguide, etc.

The "relative refractive index" or "relative refractive index percent" as used herein with respect to dual-core optical fibers and the waveguides of dual-core optical fibers is defined according to equation (1):

$$\Delta\% = 100\frac{n^2(r) - n_c^2}{2n^2(r)} \quad (1)$$

where n(r) is the refractive index at the radial distance r from the waveguide's centerline (corresponding to r=0) and $n_c$ is the refractive index of the common cladding. The refractive indices are measured at a wavelength of 1550 nm, unless otherwise specified. In some embodiments, the common cladding comprises undoped silica glass and $n_c$=1.444. In some embodiments, the common cladding comprises silica doped with an up-dopant (e.g. chlorine), and $n_c$>1.444. In some embodiments, the common cladding comprises silica doped with a down-dopant (e.g. fluorine), and $n_c$<1.444. As used herein, the relative refractive index is represented by Δ (or "delta") or Δ % (or "delta %") and its values are given in units of "%" or "% Δ", unless otherwise specified. Relative refractive index may also be expressed as Δ(r) or Δ(r) %. When the refractive index of a region is less than the reference index $n_c$, the relative refractive index is negative and can be referred to as a trench or depressed region. When the refractive index of a region is greater than the reference index lie, the relative refractive index is positive and the region can be said to be raised or a positive relative refractive index.

The "refractive index profile" is the relationship between refractive index or relative refractive index and radial distance r from the waveguide's centerline for each waveguide of the dual-core optical fiber. For relative refractive index profiles depicted herein as having relatively sharp boundaries between various regions, normal variations in processing conditions known in the art may result in step boundaries at the interface of adjacent regions that are not sharp. It is to be understood that although boundaries of refractive index profiles may be depicted herein as step changes in refractive index, the boundaries in practice may be rounded or otherwise deviate from perfect step function characteristics. It is further understood that the value of the relative refractive index may vary with radial position within the core region and/or any of the cladding regions. When relative refractive index varies with radial position in a particular region of the fiber (within a core region and/or any of the cladding regions of the waveguide and/or common cladding), it may be expressed in terms of its actual or approximate functional dependence or in terms of an average value applicable to the region. Unless otherwise specified, if the relative refractive index of a region (core region and/or any of the inner, outer and/or common cladding regions) is expressed as a single value, it is understood that the relative refractive index in the region is constant, or approximately constant, and corresponds to the single value or that the single value represents an average value of a non-constant relative refractive index dependence with radial position in the region. Whether by design or as a consequence of normal manufacturing variability, the dependence of relative refractive index on radial position may be sloped, curved, or otherwise non-constant.

The term "α-profile" (also referred to as an "alpha profile") refers to a relative refractive index profile Δ(r) that has the following functional form (2):

$$\Delta(r) = \Delta(r_0)\left\{1 - \left[\frac{|r-r_0|}{(r_1-r_0)}\right]^\alpha\right\} \quad (2)$$

where $r_o$ is the point at which Δ(r) is maximum, $r_1$ is the point at which Δ(r) is zero (disposed radially outward of $r_o$), and r is in the range $r_i \le r \le r_f$, where $r_i$ is the initial point of the α-profile, $r_f$ is the final point of the α-profile, and α is a real number, referred to herein as an "alpha value." In some embodiments, examples shown herein can have a core region alpha value of 1≤α≤100. In practice, in an actual optical fiber, even when the target profile is an alpha profile, some level of deviation from the ideal configuration can occur. Therefore, the alpha value for an optical fiber may be obtained from a best fit of the measured index profile, as is known in the art.

The term "graded-index profile" refers to an alpha profile, where α<10. The term "step-index profile" refers to an alpha profile, where α≥10.

The cutoff wavelength of an optical fiber is the minimum wavelength at which the optical fiber will support only one propagating mode. For wavelengths below the cutoff wavelength, multimode transmission may occur and an additional source of dispersion may arise to limit the fiber's information carrying capacity. Cutoff wavelength will be reported herein as a cable cutoff wavelength. The cable cutoff wavelength is based on a 22-meter cabled fiber length as specified in TIA-455-80: FOTP-80 IEC-60793-1-44 Optical Fibres—Part 1-44: Measurement Methods and Test Procedures—Cut-off Wavelength (21 May 2003), by Telecommunications Industry Association (TIA).

"Chromatic dispersion," herein referred to as "dispersion" unless otherwise noted, of an optical fiber is the sum of the material dispersion, the waveguide dispersion, and the intermodal dispersion. "Material dispersion" refers to the manner in which the refractive index of the material used for the optical core affects the velocity at which different optical wavelengths propagate within the core. "Waveguide dispersion" refers to dispersion caused by the different refractive indices of the core and cladding of the optical fiber. In the case of single mode fibers, the intermodal dispersion is zero. Dispersion values in a two-mode regime assume intermodal dispersion is zero. The zero dispersion wavelength ($\lambda_0$) is the wavelength at which the dispersion has a value of zero. Dispersion slope is the rate of change of dispersion with respect to wavelength. Dispersion and dispersion slope are reported herein at a wavelength of 1310 nm or 1550 nm, as noted, and are expressed in units of ps/nm/km and ps/nm²/km, respectively. Chromatic dispersion is measured as specified by the IEC 60793-1-42:2013 standard, "Optical fibres—Part 1-42: Measurement methods and test procedures—Chromatic dispersion."

As used herein, the dual-core optical fiber can include a first waveguide and a second waveguide. Each waveguide or core portion comprises an outer radius $r_c$. In embodiments, the outer radius $r_c$ of each waveguide corresponds to an outer radius $r_3$ of a depressed cladding region of that waveguide, if the waveguide includes a depressed cladding region. In embodiments in which a waveguide has a core region, an inner cladding region and no depressed cladding region, the radius $r_c$ of the waveguide corresponds to the outer radius $r_2$ of the inner cladding region. In embodiments in which a waveguide has a core region, no inner cladding region and no depressed cladding region, the radius $r_c$ of the waveguide corresponds to the outer radius $r_1$ of the core region. Each waveguide is disposed within a common cladding of the dual-core optical fiber, where the common cladding has a radius $R_4$.

An "up-dopant" is a substance added to a glass that has a propensity to raise the refractive index relative to pure undoped silica. A "down-dopant" is a substance added to a glass that has a propensity to lower the refractive index relative to pure undoped silica. Examples of up-dopants include $GeO_2$ (germania), $Al_2O_3$, $P_2O_5$, $TiO_2$, Cl, Br, and alkali metal oxides, such as $K_2O$, $Na_2O$, $Li_2O$, $Cs_2O$, $Rb_2O$, and mixtures thereof. Examples of down-dopants include fluorine and boron.

The term "cross-talk" in a multi-core (e.g. dual-core) optical fiber is a measure of how much power leaks from one waveguide to another. The cross-talk can be determined based on the coupling coefficient, which depends on the refractive index profile design of the waveguides, specifically the distance between the two waveguides, the structure of the cladding(s) surrounding the core region of the two waveguides, and Ail, which depends on a difference in propagation constant β values between the two waveguides (e.g., as described herein in a dual-core optical fiber, two waveguides comprising cores having centerlines separated by a waveguide-to-waveguide separation distance).

The cross-talk (in dB) between the two waveguides is given by equation (3), where $P_2$ is the cross-talk power signal in one waveguide resulting from a signal with power $P_1$ launched into the other waveguide. As used herein, cross-talk performance is referenced to a 100 km length L of optical fiber. However, cross-talk performance can also be represented with respect to alternative optical fiber lengths, with appropriate scaling. For optical fiber lengths other than 100 km, the cross-talk X(L) between waveguides can be determined using equation (4):

$$X = 10\log\left(\frac{P_2}{P_1}\right) \quad (3)$$

$$X(L) = X(100) + 10\log\left(\frac{L}{100}\right) \quad (4)$$

For example, for a 10 km length of optical fiber, the cross-talk can be determined by adding "−10 dB" to the cross-talk value for a 100 km length optical fiber. For a 1 km length of optical fiber, the cross-talk can be determined by adding "−20 dB" to the cross-talk value for a 100 km length of optical fiber. For long-haul transmission in an uncoupled-core dual-core fiber, the cross-talk should be less than or equal to −30 dB, less than or equal to −40 dB, or even less than or equal to 50 dB.

Techniques for determining cross-talk between cores in a dual-core optical fiber can be found in M. Li, et al., "Coupled Mode Analysis of Cross-talk in Dual-core fiber with Random Perturbations," in Optical Fiber Communication Conference, OSA Technical Digest (online), *Optical Society of America*, 2015, paper W2A.35, T. Hayashi et al., "125-μm-Cladding Eight-Core Multi-Core Fiber Realizing Ultra-High-Density Cable Suitable for O-Band Short-Reach Optical Interconnects," J. Lightwave Technology, Vol. 34, No. 1, pp. 85-92, published Jan. 1, 2016, and T. Hayashi et al., "Physical interpretation of intercore crosstalk in multi-core fiber: Effects of macrobend, structure fluctuation, and microbend," *Opt. Exp.*, vol. 21, no. 5, pp. 5401-5412, March 2013, the contents of which are all incorporated herein by reference in their entirety.

As used herein, the "effective area" of an optical fiber is the area of the optical fiber in which light is propagated and is defined as:

$$A_{eff} = 2\pi \frac{\left(\int_0^\infty E^2 r dr\right)^2}{\int_0^\infty E^4 r dr}, \quad (5)$$

where E is the electric field associated with light propagated (guided) in the waveguide of the fiber and r is the radial coordinate of the waveguide of the fiber. The effective area is determined at a wavelength of 1550 nm, unless otherwise specified.

The mode field diameter (MFD) is measured using the Petermann II method and was determined from:

$$MFD = 2w \quad (6)$$

$$w = \frac{\int_0^\infty (f(r))^2}{\int_0^\infty \left(\frac{df(r)}{dr}\right)^2 r dr} \quad (7)$$

where f(r) is the transverse component of the electric field distribution of the light guided in a waveguide (core portion) and r is the radial coordinate of the waveguide (core portion) of the fiber. Unless otherwise specified, "mode field diameter" or "MFD" refers to the mode field diameter at 1310 nm.

Directional terms as used herein—for example up, down, right, left, front, back, top, bottom—are made only with reference to the figures as drawn and are not intended to imply absolute orientation.

As used herein, the singular forms "a," "an" and "the" include plural referents unless the context clearly dictates otherwise. Thus, for example, reference to "a" component includes aspects having two or more such components, unless the context clearly indicates otherwise.

FIG. 1 schematically depicts a cross-sectional view of a dual-core optical fiber 10 comprising a glass portion 12 and a coating portion 14 encircling and directly contacting the glass portion 12. The glass portion 12 comprises a first waveguide 16, a second waveguide 18, and a common cladding 20. In embodiments, the common cladding 20 is constructed of pure silica glass and comprises a longitudinal centerline 22 (positioned at R=0). In embodiments, the longitudinal centerline 22 of the common cladding 20 coincides with a longitudinal centerline of the dual-core optical fiber 10. The common cladding 20 comprises an outer surface 24 circumferentially surrounding and disposed a radial distance $R_4$ from the longitudinal centerline 22. The radial distance $R_4$ defines a radius of the glass portion 12. In embodiments, $R_4$ is less than or equal to 55 µm (e.g., greater than or equal to 35.0 µm and less than or equal to 55.0 µm, greater than or equal to 35.0 µm and less than or equal to 45.0 µm, greater than or equal to 38.0 µm and less than or equal to 42.0 µm, greater than or equal to 39.0 µm and less than or equal to 41.0 µm, greater than or equal to 45.0 µm and less than or equal to 55.0 µm, greater than or equal to 48.0 µm and less than or equal to 52.0 µm, greater than or equal to 49.0 µm and less than or equal to 51.0 µm, greater than or equal to 40.0 µm and less than or equal to 50.0 µm, greater than or equal to 42.0 µm and less than or equal to 48.0 µm, greater than or equal to Δ3.0 µm and less than or equal to 47.0 µm, greater than or equal to 44.0 µm and less than or equal to 46.0 µm). Such a radial dimension $R_4$ may facilitate incorporating the dual-core optical fiber 10 into optical fiber cables and interconnects with higher core densities than certain existing designs, as described herein.

The first and second waveguides 16 and 18 extend through the common cladding 20. The first waveguide 16 comprises a first core longitudinal centerline 26 (corresponding to r=0 for first waveguide 16) and the second waveguide 18 comprises a second core longitudinal centerline 28 (corresponding to r=0 for second waveguide 18). In the depicted embodiment, the first and second core longitudinal centerlines 26 and 28 are arranged equidistantly from the longitudinal centerline 22 of the common cladding 20 and separated from one another by a waveguide-to-waveguide separation distance 29. In embodiments, the waveguide-to-waveguide separation distance 29 is greater than or equal to 30.0 µm (e.g., greater than or equal to 30.0 µm and less than or equal to 45.0 µm, greater than or equal to 32.5 µm and less than or equal to Δ3 µm, greater than or equal to 32.5 µm and less than or equal to 35.0 µm, greater than 37.5 µm and less than or equal to 45 µm, greater than 40.0 µm and less than or equal to 45 µm, greater than or equal to 35.0 µm and less than or equal to 40.0 µm, greater than or equal to 35.0 µm and less than or equal to 37.5 µm). Such separation between the first and second core longitudinal centerlines 26 and 28 may facilitate a compact design for the dual-core optical fiber 10, including a radial dimension $R_4$ of the common cladding 20 that is less than that used in certain existing optical fibers, while still maintaining a cross-talk between the first and second waveguides 16 and 18 that is less than or equal to −30 dB at 1310 nm.

The first waveguide 16 is depicted as comprising a first waveguide radius $r_{c1}$ and the second waveguide 18 is depicted as comprising a second waveguide radius $r_{c2}$. In embodiments, the first waveguide radius $r_{c1}$ is approximately equal to the second waveguide radius $r_{c2}$. In embodiments the first waveguide radius $r_{c1}$ differs from the second waveguide radius $r_{c2}$, such as when the first and second waveguides 16 and 18 include different combinations of components. For example, in embodiments, one of the first and second waveguides 16 and 18 comprises a depressed cladding region circumferentially surrounding a core region (e.g., as shown and described with respect to FIG. 2), while the other of the first and second waveguides 16 and 18 does not include such a depressed cladding region. In such embodiments, the waveguide radius $r_c$ of the waveguide including the depressed cladding region may be greater than that of a waveguide not including the depressed cladding region. The crosstalk of the dual-core multicore fiber will be less than −30 dB at 1310 nm because the depressed cladding region surrounding one of the two cores is sufficient to prevent the optical power propagating in either core from leaking to the other core.

In embodiments, edges of the first and second waveguides 16 and 18 are separated from the outer surface 24 of the common cladding 20 by at least a minimum waveguide edge to glass edge distance 30. As depicted in FIG. 1, the minimum waveguide edge to glass edge distance 30 is the minimum distance from a point along the outer circumference of one of the first and second waveguides 16 and 18 (e.g., corresponding to the $r_3$ value for the embodiment of the waveguide, as described herein with respect to FIG. 2, that includes an inner cladding region and a depressed cladding region) to a nearest point along the circumference of the outer surface 24, as determined by a line segment between the point along the outer circumference of the waveguide and the nearest point along the circumference on the outer surface 24 in a plane perpendicular to the longitudinal centerline 22. In embodiments, the minimum waveguide edge to glass edge distance 30 is greater than or equal to 5.0 µm and less than or equal to 20.0 µm, or greater than or equal to 5.0 µm and less than or equal to 15.0 µm, or greater than or equal to 5.0 µm and less than or equal to 12.0 µm, or greater than or equal to 5.0 µm and less than or equal to 10.0 µm. Without intending to be bound by any particular theory, it is believed that the extent of signal loss due to tunneling is dependent upon the minimum value for the minimum waveguide edge to glass edge distance 30, so maintaining the minimum waveguide edge to glass edge distance 30 may minimize tunneling loss while maintaining separation between the first and second waveguides 16 and 18 to inhibit cross-talk.

Referring still to FIG. 1, the coating portion 14 is depicted to include a primary coating 32 encircling and directly contacting the common cladding 20 and a secondary coating 34 encircling and directly contacting the primary coating 32. In embodiments, the primary coating 32 serves as a buffer to protect the glass portion 12 when the dual-core optical fiber 10 is bent, cabled, or spooled. The primary coating 32 may also serve to protect the outer surface 24 of the glass portion 12 from water absorption. The secondary coating 34 may be applied over the primary coating 32 and serves as a protective layer that prevents the glass portion 12 from being damaged during processing and use. The primary coating 32 is depicted to include a radius $R_5$ and the secondary coating 34 is depicted to include a radius $R_6$. In embodiments, $R_6$ defines an external radius of the dual-core optical fiber 10. This thickness of the primary coating is $T_P=R_5-R_4$. In embodiments, $T_P$ is less than 25 µm, or is less than 20 µm or is less than 15 µm, or is between 10 µm and 25 µm or is between 10 µm and 20 µm. This thickness of the secondary coating is $T_S=R_6-R_5$. In embodiments, $T_S$ is less than 25 µm, or is less than 20 µm or is less than 15 µm, or is between 10 µm and 25 µm or is between 10 µm and 20 µm. In embodiments, $R_6$ is greater than or equal to $1.9*R_4$ and less than or equal to $2.1*R_4$ to facilitate interleaving during connectorization into fiber array units (FAUs), as described herein with respect to FIG. 8D.

Figure 2:
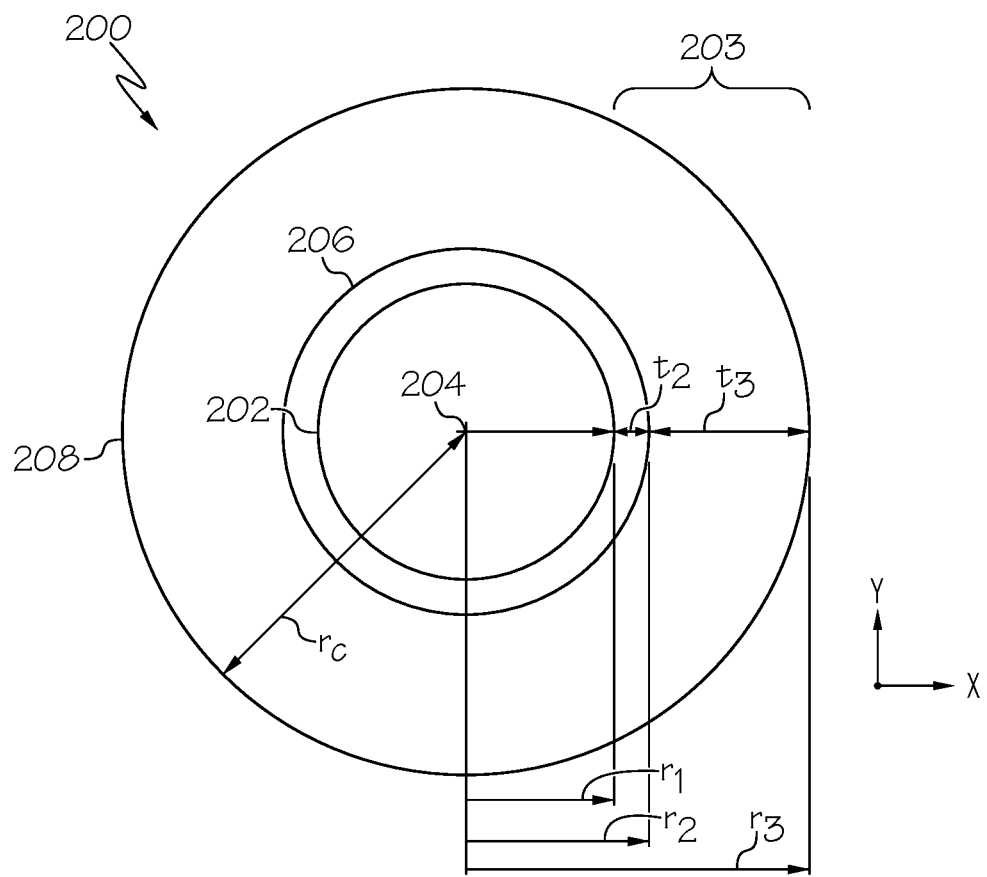
FIG. 2 schematically depicts a cross-sectional view of a waveguide that may be used in the dual-core optical fiber depicted in FIG. 1, according to one or more embodiments described herein.

FIG. 2 schematically depicts a cross sectional view of a waveguide 200 of a dual-core optical fiber, in accordance with one or more embodiments. In embodiments, each of the first and second waveguides 16 and 18 of the dual-core optical fiber 10 described herein with respect to FIG. 1 comprises the structure of the waveguide 200. In other embodiments, one of the first and second waveguides 16 and 18 of the dual-core optical fiber 10 has the structure of waveguide 200 and the other of the first and second waveguides 16 and 18 of the dual-core optical fiber 10 has a structure other than the structure of waveguide 200 (e.g., the other of the first and second waveguides 16 and 18 includes only a core region or a core region and depressed cladding region without an inner cladding region). The waveguide 200 is depicted to comprise a core region 202 centered on a centerline 204 and a cladding region 203. The centerline 204 may correspond to the first and second core longitudinal centerlines 26 and 28 described herein with respect to FIG. 1. The cladding region 203 comprises an inner cladding region 206 encircling and directly contacting the core region 202 and a depressed cladding region 208 encircling and directly contacting the inner cladding region 206. In embodiments, the core region 202 and the cladding region 203 are concentric such that the cross section of the waveguide 200 is generally circular symmetric with respect to the centerline 204 having an overall waveguide radius $r_c$. One or both of inner cladding region 206 and depressed cladding region 208 is optional. In embodiments in which waveguide 200 includes inner cladding region 206 and depressed cladding region 208, the waveguide radius $r_c$ corresponds to the radius $r_3$ of the depressed cladding region 208. In embodiments in which waveguide 200 includes inner cladding region 206 and lacks depressed cladding region 208, the waveguide radius $r_c$ corresponds to the radius $r_2$ of the inner cladding region 206. In embodiments in which waveguide 200 lacks inner cladding region 206 and includes depressed cladding region 208, the waveguide radius $r_c$ corresponds to the radius $r_3$ of the depressed cladding region 208. In embodiments in which waveguide 200 lacks both inner cladding region 206 and depressed cladding region 208, the waveguide radius $r_c$ corresponds to the radius $r_1$ of the core region 202.

In the depicted embodiment, the core region 202 has a radius $r_1$ and the depressed cladding region 208 has a radius $r_3$ that defines an outer radius of the waveguide 200 such that $r_3$ corresponds to the radius $r_c$ associated with the waveguide 200. The inner cladding region 206 extends between the radius $r_1$ of the core region 202 and an inner radius $r_2$ of the depressed cladding region 208 such that the inner cladding region 206 has a thickness $t_2=r_2-r_1$ in the radial direction. The depressed cladding region 208 has a thickness $t_3=r_3-r_2$ in the radial direction. The structure, compositions, and optical properties of each of the core region 202, the inner cladding region 206, and the depressed cladding region 208 are described in greater detail herein.

Figure 3:
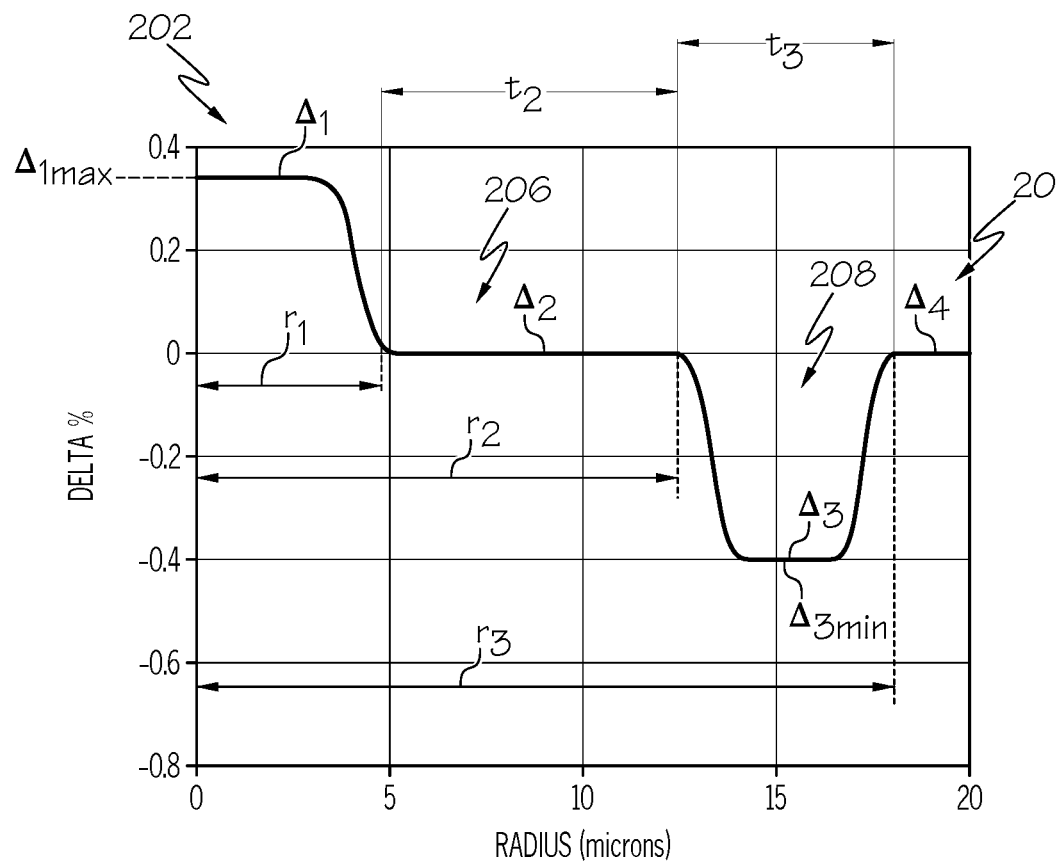
FIG. 3 depicts a first example relative refractive index profile of the waveguide of FIG. 2, according to one or more embodiments described herein.
Figure 4:
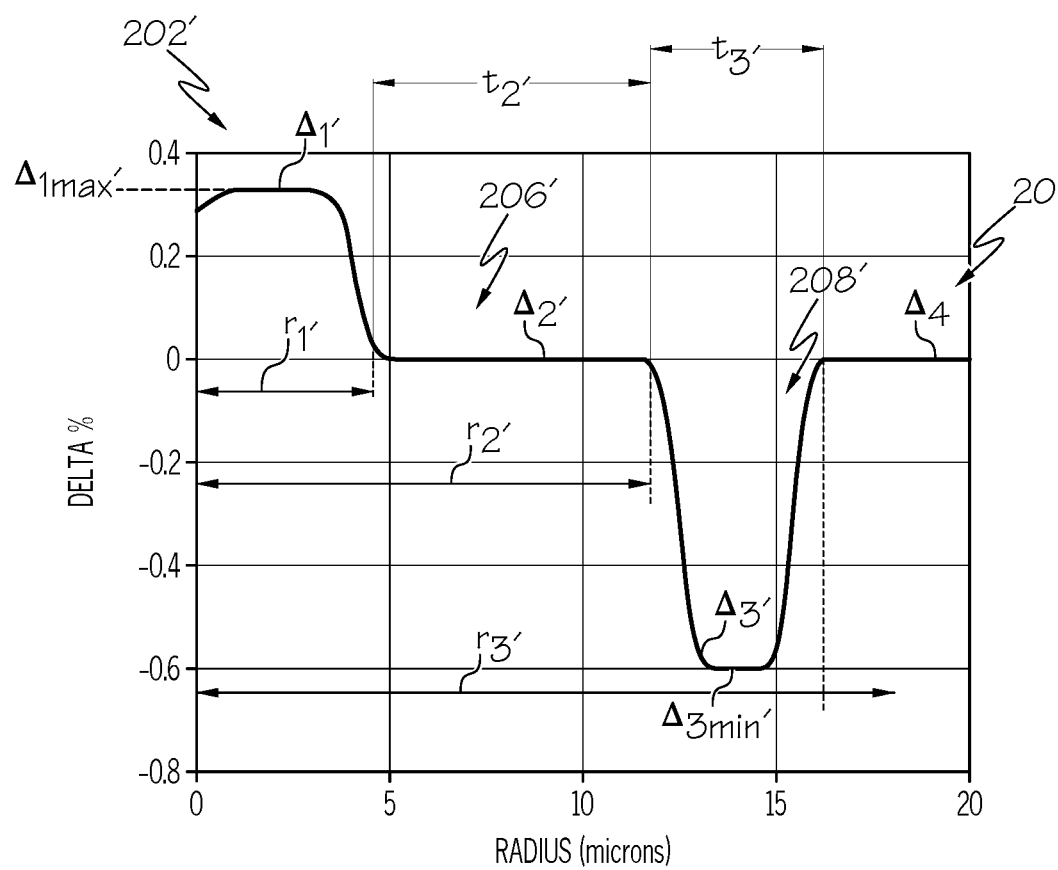
FIG. 4 depicts a second example relative refractive index profile of the waveguide of FIG. 2, according to one or more embodiments described herein.
Figure 5:
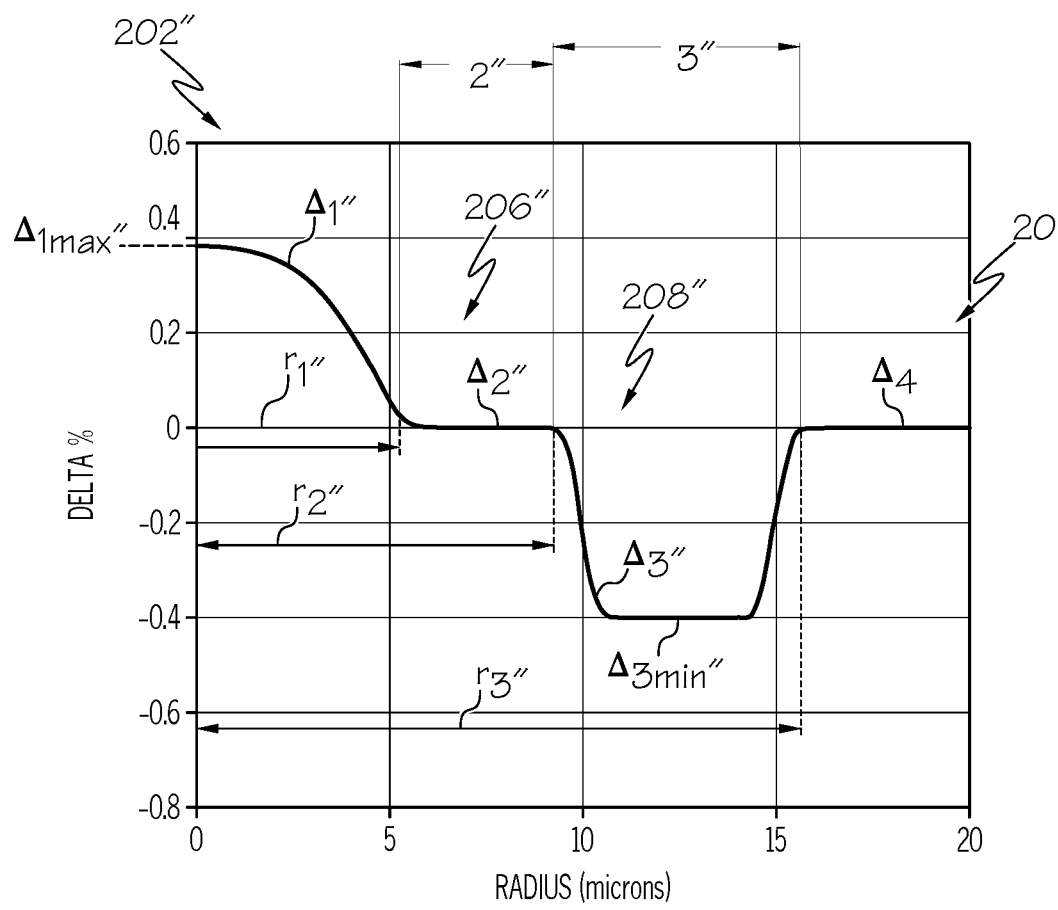
FIG. 5 depicts a third example relative refractive index profile of the waveguide of FIG. 2, according to one or more embodiments described herein.
Figure 6:
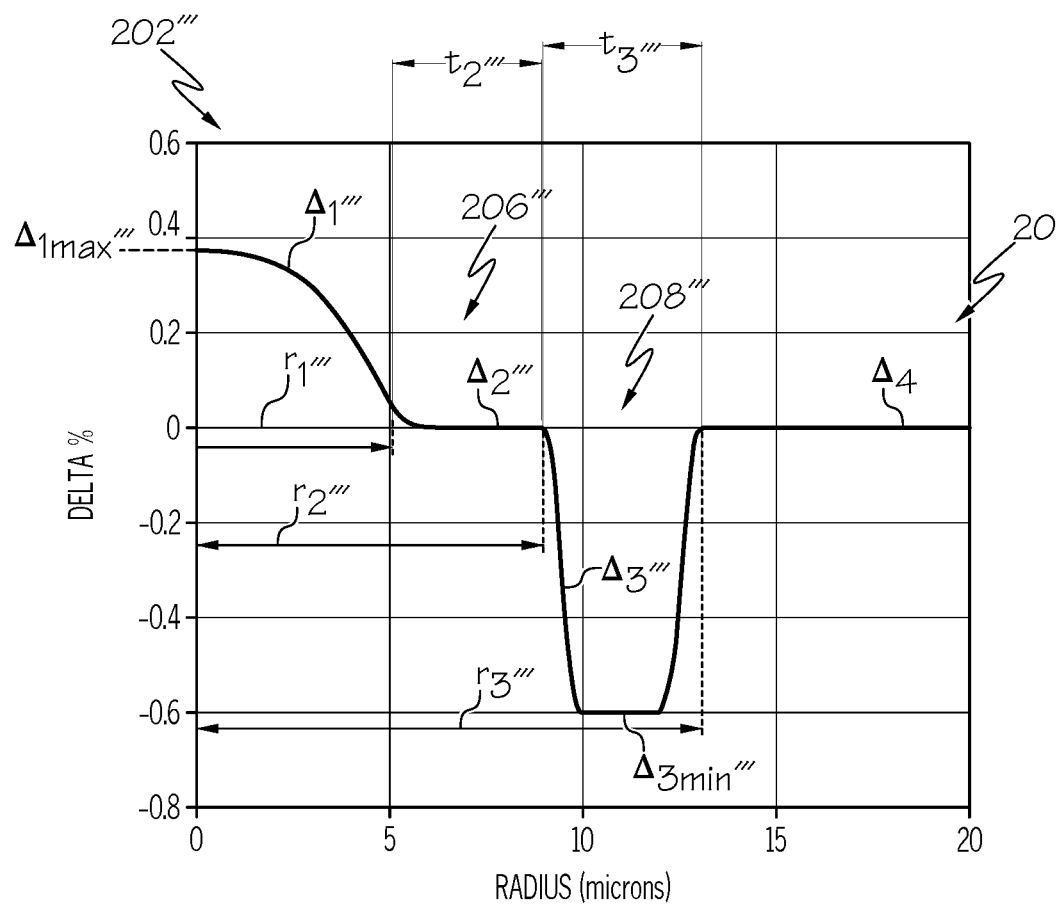
FIG. 6 depicts a first example relative refractive index profile of the waveguide of FIG. 2, according to one or more embodiments described herein.

Referring to FIGS. 2 and 3, a radial cross section of one embodiment of the waveguide 200 (FIG. 2) and corresponding relative refractive index profile (FIG. 3) of the waveguide 200 are schematically depicted. In embodiments, each of the first and second waveguides 16 and 18 of the dual-core optical fiber 10 described herein with respect to FIG. 1 may be identical in structure to the waveguide 200 depicted in FIG. 2. As such, the relative refractive index profile depicted in FIG. 3 may extend radially outward from one of the first and second core longitudinal centerlines 26 and 28, such as along the line III-III of FIG. 1. That is, in FIG. 3, the relative refractive index profile of the first waveguide 16 is plotted as a function of radial distance r from the first core longitudinal centerline 26. As depicted in FIG. 1, the relative refractive index profile depicted in FIG. 3 extends radially outward from the first core longitudinal centerline 26 and into a portion of the common cladding 20. The relative refractive index profile depicted in FIG. 3 represents only one example of a relative refractive index profile that may be used in one of the waveguides of the dual-core fibers described herein. FIGS. 4, 5, and 6 provide other suitable example relative refractive index profiles that may be included.

As depicted in FIG. 3, the core region 202 has a relative refractive index $\Delta_1$. In embodiments, the core region 202 comprises silica-based glass having an up-dopant (e.g., germanium or chlorine) such that $\Delta_1(r)$ is positive. In embodiments, the relative refractive index $\Delta_1$ includes a maximum relative refractive index $\Delta_{1max}$ (relative to pure silica). In embodiments, the relative refractive index $\Delta_1$ may vary with radial coordinate (radius) r and be represented as $\Delta_1(r)$. In embodiments, the maximum relative refractive index $\Delta_{1max}$ may occur at r=0 (e.g., at the centerline 204). In the depicted example, the relative refractive index profile $\Delta_1(r)$ varies in accordance with a rounded step index profile such that $\Delta_1(r)$, comprises an alpha value of greater than or equal to 6 and less than or equal 20, and remains substantially equal to $\Delta_{1max}$ and transitions downward proximate to the radius $r_1$ of the core region 202. In embodiments, $\Delta_{1max}$ is greater than or equal to 0.32%$\Delta$ and less than or equal to 0.40%$\Delta$. The radius $r_1$ of the waveguide is greater than or equal to 4.0 µm and less than or equal to 6.0 µm. In embodiments, the radius $r_1$ coincides with an inner radius of inner cladding region 206.

Referring still to FIGS. 2 and 3, the inner cladding region 206 extends from radius $r_1$ to a radius $r_2$ such that the inner cladding has a radial thickness $t_2=r_2-r_1$. In embodiments, the inner cladding region 206 comprises a relative refractive index $\Delta_2$. In embodiments, the inner cladding region 206 is formed from silica-based glass that is substantially free of dopants (e.g., up-dopants and down-dopants) such that the relative refractive index $\Delta_2$ is approximately 0. In embodiments, the inner cladding region 206 is formed from a similar silica-based glass as the common cladding 20 (see FIG. 1) such that $\Delta_2=\Delta_4$. Without wishing to be bound by theory, it is believed that the value of $r_2$ (and hence the radial thickness $t_2$ of the inner cladding region 206) in part determines the zero dispersion wavelength of the waveguide 200. In embodiments, the waveguide 200 has a zero dispersion wavelength of greater than or equal 1300 nm and less than or equal to 1324 nm. To achieve such a zero dispersion wavelength, $r_2$ may be greater than or equal to 10 µm and less than or equal to 15 µm, and $t_2$ may be greater than or equal to 6.0 µm and less than or equal to 10 µm.

The depressed cladding region 208 extends from the radius $r_2$ to the radius $r_3$ such that the depressed cladding region has a radial thickness $t_3=r_3-r_2$. The radius $r_3$ may correspond to the outer radius $r_{c1}$ and/or $r_{c2}$ of the first and second waveguides 16 and 18 described herein with respect to FIG. 1. In embodiments, the waveguide 200 has an outer diameter $d=2*r_3$. Without wishing to be bound by theory, it is believed that the value of $r_3$ (and hence the radial thickness $t_3$ of the depressed cladding region 208) in part determines a zero dispersion wavelength of the waveguide 200. In embodiments, each the waveguide 200 has a zero dispersion wavelength of greater than or equal 1300 nm and less than or equal to 1324 nm. To achieve such a zero dispersion wavelength and/or other advantages (e.g. low bend loss and/or low cross-talk), $r_3$ may be greater than or equal to 11 µm and less than or equal to 20 µm. In embodiments, $r_3$ may be greater than or equal to 14 µm and less than or equal to 16 µm. In embodiments, $r_3$ is less than or equal to $0.9*R_4/2$ of the common cladding 20 (see FIG. 1). In embodiments, $r_3$ is less than or equal to $0.8*R_4/2$ of the common cladding 20 (see FIG. 1).

The depressed cladding region 208 has a relative refractive index $\Delta_3$. In embodiments, the relative refractive index $\Delta_3$ is less than or equal to the relative refractive index $\Delta_2$ of the inner cladding region 206 throughout the depressed cladding region 208. The relative refractive index $\Delta_3$ may also be less than or equal to the relative refractive index $\Delta_4$ of the common cladding 20 (see FIG. 1) such that the depressed cladding region 208 forms a trench in the relative refractive index profile of the waveguide 200. The term "trench," as used herein, refers to a region of the waveguide that is, in radial cross section, surrounded by regions of the multicore fiber (e.g., the inner cladding region 206 and the common cladding 20) having relatively higher refractive indexes. In embodiments, the relative refractive index $\Delta_3$ may be constant throughout the depressed cladding region 208. In other embodiments, the relative refractive index $\Delta_3$ may vary with radial coordinate r (radius) and be represented as $\Delta_3(r)$. In embodiments, the relative refractive index $\Delta_3(r)$ within the depressed cladding region 208 comprises a minimum relative refractive index $\Delta_3$ min. Referring still to FIGS. 2-3, in embodiments $\Delta_1>\Delta_2>\Delta_{3min}$. In embodiments, $\Delta_2 \geq \Delta_3$ such that the depressed cladding region 208 forms a depressed-index trench in a relative refractive index profile of each waveguide between $r_2$ and $r_3$.

Referring still to FIGS. 2 and 3, in embodiments, the depressed cladding region 208 comprises silica glass having one or more down-dopants (e.g., fluorine). In embodiments, the down-dopant concentration within the depressed cladding region 208 varies as a function of radial distance from the centerline 204 of the waveguide 200. In embodiments, the maximum value of the down-dopant concentration is greater than or equal to 0.5 wt. % and less than or equal to 2.5 wt. %. In embodiments, the maximum fluorine concentration Fmax is greater than or equal to 1.0 wt. % and less than or equal to 2.0 wt. %. In embodiments, $\Delta_3$ min is less than or equal –0.2% $\Delta$ and greater than or equal to –0.7% $\Delta$, or $\Delta_3$ min is less than or equal –0.2% $\Delta$ and greater than or equal to –0.6% $\Delta$, or $\Delta_{3min}$ is less than or equal –0.2% $\Delta$ and greater than or equal to –0.5% $\Delta$, or $\Delta_{3min}$ is less than or equal –0.3% $\Delta$ and greater than or equal to –0.5% $\Delta$.

The radial thickness of a particular glass portion of the waveguide 200 may be interrelated with a relative refractive index of the particular glass portion. Specifically, a glass portion 'i' with a relative refractive index $\Delta_i\%$, an inner radius $r_{in}$ and an outer radius $r_{out}$ may have a relative refractive index volume $V_i$ defined as:

$$V_i = 2\int_{r_{in}}^{r_{out}} \Delta_i(r)*rdr. \qquad (8)$$

Accordingly, the depressed cladding region 208 may have a relative refractive index volume $V_3$, referred to herein as a trench volume $V_T$, of:

$$V_T = \int_{r_2}^{r_3} \Delta_3(r)*rdr \qquad (9)$$

Without wishing to be bound by theory, it is believed that the trench volume $V_T$ within the depressed cladding region 208 influences the zero dispersion wavelength, bend loss, and the mode field diameter of the waveguide 200. Without wishing to be bound by theory, it is believed that larger trench volumes $V_T$ tend to confine the light travelling through the waveguide 200 and make the mode field diameter of each waveguide 200 smaller. In embodiments, the depressed cladding region 208 comprises a trench volume $V_T$ of less than or equal to –20%µm² (e.g., less than or equal to –30%µm² and greater than or equal to –70%µm², less than or equal to –30%µm² and greater than or equal to –60%µm², less than or equal to –40%µm² and greater than or equal to –60%µm²).

FIG. 4 depicts another embodiment of a relative refractive index profile $\Delta(r)$ that may be used within the waveguide 200 of FIG. 2. As shown, in this embodiment, the waveguide 200 comprises a core region 202' with a relative refractive index $\Delta_{1'}(r)$ that comprises a maximum value $\Delta_{1max'}$ at a position offset from the centerline 204 of the waveguide 200. The relative refractive index $\Delta_{1'}(r)$ may vary in accordance with a rounded step index profile and comprise an alpha value that is greater than 6 and less than or equal to 20. The core region 202' comprises a radius $r_{1'}$. In embodiments, $\Delta_{1max'}$ is greater than or equal to 0.32% $\Delta$ and less than or equal to 0.40% $\Delta$. In embodiments, $r_{1'}$ is greater than or equal to 4.0 µm and less than or equal to 5.5 µm. In embodiments, the radius $r_{1'}$ coincides with an inner radius an inner cladding region 206'. The inner cladding region 206' extends from radius $r_{1'}$ to a radius $r_{2'}$ such that the inner cladding has a radial thickness $t_{2'}=r_{2'}-r_{1'}$. In embodiments, the inner cladding region 206' comprises a relative refractive index $\Delta_{2'}$. In embodiments, the inner cladding region 206' is formed from silica-based glass that is substantially free of dopants (e.g., up-dopants and down-dopants) such that the relative refractive index $\Delta_{2'}$ is approximately 0. In embodiments, the inner cladding region 206' is formed from a similar silica-based glass as the common cladding 20 (see FIG. 1) such that $\Delta_{2'}=\Delta_4$. Without wishing to be bound by theory, it is believed that the value of $r_{2'}$ (and hence the radial thickness $t_{2'}$ of the inner cladding region 206) in part determines the zero dispersion wavelength of the waveguide 200. In embodiments, the waveguide 200 has a zero dispersion wavelength of greater than or equal 1300 nm and less than or equal to 1324 nm. To achieve such a zero dispersion wavelength, $r_{2'}$ may be greater than or equal to 10 μm and less than or equal to 15 μm, and $t_{2'}$ may be greater than or equal to 6.0 μm and less than or equal to 10 μm.

In the embodiment depicted in FIG. 4, the waveguide 200 comprises a depressed cladding region 208' extends from the radius $r_{2'}$ to the radius $r_{3'}$ such that the depressed cladding region 208' has a radial thickness $t_3=r_{3'}-r_{2'}$. Without wishing to be bound by theory, it is believed that the value of $r_{3'}$ (and hence the radial thickness $t_3$ of the depressed cladding region 208) in part determines a zero dispersion wavelength of the waveguide 200. In embodiments, each the waveguide 200 has a zero dispersion wavelength of greater than or equal 1300 nm and less than or equal to 1324 nm. To achieve such a zero dispersion wavelength and/or other advantages (e.g. low bend loss and/or low cross-talk), $r_{3'}$ may be greater than or equal to 11 μm and less than or equal to 20 μm. In embodiments, $r_{3'}$ may be greater than or equal to 14 μm and less than or equal to 16 μm.

The depressed cladding region 208' has a relative refractive index $\Delta_{3'}$. In embodiments, the relative refractive index $\Delta_{3'}$ is less than or equal to the relative refractive index $\Delta_{2'}$ of the inner cladding region 206' throughout the depressed cladding region 208'. The relative refractive index $\Delta_3$ may also be less than or equal to the relative refractive index $\Delta_{4'}$ of the common cladding 20 (see FIG. 1) such that the depressed cladding region 208' forms a trench in the relative refractive index profile of the waveguide 200. In embodiments, the depressed cladding region 208' comprises a trench volume $V_T$ of less than or equal to −30%μm² (e.g., less than or equal to −30%μm² and greater than or equal to −70%μm², less than or equal to −30%μm² and greater than or equal to −60%μm², less than or equal to −40%μm² and greater than or equal to −60%μm²).

In comparing the relative refractive index profiles depicted in FIGS. 3 and 4, $r_{3'}$ of the depressed cladding region 208' is less than $r_3$ of the depressed cladding region 208, while $\Delta_{3min'}$ of the depressed cladding region 208' is less than $\Delta_{3min}$ of the depressed cladding region 208, such that the depressed cladding regions 208 and 208' comprise comparable trench volumes. Referring to FIG. 1, incorporating the relative refractive index profile depicted in FIG. 4 into each of the first and second waveguides 16 and 18 may facilitate providing a waveguide-to-waveguide separation distance 29, that is greater than $2*r_{3'}$ to inhibit cross-talk. In embodiments where both the first and second waveguides 16 and 18 comprise a depressed cladding region, the relative refractive index profile depicted in FIG. 4 may be preferable over the relative refractive index profile depicted in FIG. 3, as the relative refractive index depicted in FIG. 4 may facilitate the waveguide-to-waveguide separation distance 29 being less than or equal to 40.0 μm (e.g., less than or equal to 38.0 μm, less than or equal to 36.0 μm, less than or equal to 35.0 μm) while still including depressed cladding regions in both the first and second waveguides 16 and 18 to lower cross-talk between the first and second waveguides 16 and 18. Such a structure, by providing a waveguide-to-waveguide separation distance of less than or equal to 40.0 μm, may facilitate maintaining the waveguide edge to glass edge distance 30 (see FIG. 1) above 5.0 μm to suppress leakage losses.

Embodiments are also envisioned where only one of the first and second waveguides 16 and 18 include a depressed cladding region (such as the depressed cladding region 208 of FIG. 3 or the depressed cladding region 208' of FIG. 4). For example, embodiments are envisioned where one of the first and second waveguides 16 and 18 comprises the depressed cladding region 208' depicted in FIG. 4, while the other one of the first and second waveguide comprises only an inner cladding region (such as the inner cladding region 206' depicted in FIG. 4) and omits a depressed cladding region. That is, the dual-core fiber 10 depicted in FIG. 1 may have an asymmetrical structure where the first and second waveguides 16 and 18 comprise different components (e.g. core regions and/or cladding regions that differ in size or composition) and/or different refractive index profiles. Such an asymmetrical structure may aid in reducing the waveguide-to-waveguide separation distance 29 (see FIG. 1), while still maintaining cross-talk between the waveguides at less than or equal to −20 dB at 1310 nm, 1490 nm, and 1550 nm, respectively.

FIG. 5 depicts another embodiment of a relative refractive index profile $\Delta(r)$ that may be used within the waveguide 200 of FIG. 2. In the embodiment depicted in FIG. 5, the waveguide 200 comprises a core region 202" that has a relative refractive index $\Delta_{1"}$. In embodiments, the core region 202" comprises silica-based glass having an up-dopant (e.g., germanium) such that $\Delta_{1"}(r)$ is positive. In embodiments, the relative refractive index $\Delta_{1"}$ includes a maximum relative refractive index $\Delta_{1max"}$ (relative to pure silica). In embodiments, the relative refractive index $\Delta_{1"}$ may vary with radial coordinate (radius) r and be represented as $\Delta_{1"}(r)$. In embodiments, the maximum relative refractive index $\Delta_{1max"}$ may occur at r=0 (e.g., at the centerline 204). In the depicted example, the relative refractive index profile $\Delta_{1"}(r)$ varies in accordance with a graded index profile such that $\Delta_{1"}(r)$, comprises an alpha value of less than or equal to 6. In embodiments, $\Delta_{1max"}$ is greater than or equal to 0.35% $\Delta$ and less than or equal to 0.45% $\Delta$. The radius of $r_{1"}$ of the core region 202" is greater than or equal to 4.5 μm and less than or equal to 6.0 μm. In embodiments, the radius $r_{1"}$ coincides with an inner radius of an inner cladding region 206".

Referring to FIGS. 2 and 5, the inner cladding region 206" extends from radius $r_{1"}$ to a radius $r_{2"}$ such that the inner cladding has a radial thickness $t_{2"}=r_{2"}-r_{1"}$. In embodiments, the inner cladding region 206" comprises a relative refractive index $\Delta_{2"}$. In embodiments, the inner cladding region 206" is formed from silica-based glass that is substantially free of dopants (e.g., up-dopants and down-dopants) such that the relative refractive index $\Delta_{2"}$ is approximately 0. In embodiments, the inner cladding region 206" is formed from a similar silica-based glass as the common cladding 20 (see FIG. 1) such that $\Delta_{2"}=\Delta_4$. Without wishing to be bound by theory, it is believed that the value of $r_{2"}$ (and hence the radial thickness $t_{2"}$ of the inner cladding region 206") in part determines the zero dispersion wavelength of the waveguide 200. In embodiments, the waveguide 200 has a zero dispersion wavelength of greater than or equal 1300 nm and less than or equal to 1324 nm. To achieve such a zero dispersion wavelength, $r_{2''}$ may be greater than or equal to 8 µm and less than or equal to 15 µm, and $t_{2''}$ may be greater than or equal to 3.5 µm and less than or equal to 10 µm.

The waveguide 200 according to the embodiment depicted in FIG. 5 also includes a depressed cladding region 208'' that extends from the radius $r_{2''}$ to the radius $r_{3''}$ such that the outer cladding has a radial thickness $t_{3''}=r_{3''}-r_{2''}$. The radius $r_{3''}$ may correspond to the outer radii $r_{c1}$ and $r_{c2}$ of the first and second waveguides 16 and 18 described herein with respect to FIG. 1. Without wishing to be bound by theory, it is believed that the value of $r_{3''}$ (and hence the radial thickness $t_{3''}$ of the depressed cladding region 208'') in part determines a zero dispersion wavelength of the waveguide 200. In embodiments, each the waveguide 200 has a zero dispersion wavelength of greater than or equal 1300 nm and less than or equal to 1324 nm. To achieve such a zero dispersion wavelength and/or other advantages (e.g. low bend loss and/or low cross-talk), $r_{3''}$ may be greater than or equal to 12 µm and less than or equal to 24 µm. In embodiments, $r_{3''}$ may be greater than or equal to 14 µm and less than or equal to 22 µm. In embodiments, $r_{3''}$ may be greater than or equal to 16 µm and less than or equal to 20 µm.

The depressed cladding region 208'' has a relative refractive index $\Delta_{3''}$. In embodiments, the relative refractive index $\Delta_{3''}$ is less than or equal to the relative refractive index $\Delta_{2''}$ of the inner cladding region 206'' throughout the depressed cladding region 208''. The relative refractive index $\Delta_{3''}$ may also be less than or equal to the relative refractive index $\Delta_4$ of the common cladding 20 (see FIG. 1) such that the depressed cladding region 208'' forms a trench in the relative refractive index profile of the waveguide 200. In embodiments, the depressed cladding region 208'' comprises a trench volume $V_T$ of less than or equal to $-30\%\mu m^2$ (e.g., less than or equal to $-30\%\mu m^2$ and greater than or equal to $-70\%\mu m^2$, less than or equal to $-30\%\mu m^2$ and greater than or equal to $-60\%\mu m^2$, less than or equal to $-40\%\mu m^2$ and greater than or equal to $-60\%\mu m^2$).

FIG. 6 depicts another embodiment of a relative refractive index profile $\Delta(r)$ that may be used within the waveguide 200 of FIG. 2. As shown, in this embodiment, the waveguide 200 comprises a core region 202''' with a relative refractive index $\Delta_{1'''}(r)$ that comprises a maximum value $\Delta_{1max'''}$ at the centerline 204 of the waveguide 200 (see FIG. 2). In embodiments, $\Delta_{1max'''}$ is greater than or equal to 0.35% $\Delta$ and less than or equal to 0.45% $\Delta$. The core region 202''' comprises a radius $r_{1'''}$. In embodiments, $r_{1'''}$ is greater than or equal to 4.5 µm and less than or equal to 6.0 µm. In embodiments, the radius $r_{1'''}$ coincides with an inner radius of an inner cladding region 206'''. The inner cladding region 206''' extends from radius $r_{1'''}$ to a radius $r_{2'''}$ such that the inner cladding has a radial thickness $t_{2'''}=r_{2'''}-r_{1'''}$. In embodiments, the inner cladding region 206''' comprises a relative refractive index $\Delta_{2'''}$. In embodiments, the inner cladding region 206''' is formed from silica-based glass that is substantially free of dopants (e.g., up-dopants and down-dopants) such that the relative refractive index $\Delta_{2'''}$ is approximately 0. In embodiments, the inner cladding region 206''' is formed from a similar silica-based glass as the common cladding 20 (see FIG. 1) such that $\Delta_{2'''}=\Delta_4$. Without wishing to be bound by theory, it is believed that the value of $r_{2'''}$ (and hence the radial thickness $t_{2'''}$ of the inner cladding region 206) in part determines the zero dispersion wavelength of the waveguide 200. In embodiments, the waveguide 200 has a zero dispersion wavelength of greater than or equal 1300 nm and less than or equal to 1324 nm. To achieve such a zero dispersion wavelength, $r_{2'''}$ may be greater than or equal to 8 µm and less than or equal to 15 µm, and $t_{2'''}$ may be greater than or equal to 3.5 µm and less than or equal to 10 µm.

In the embodiment depicted in FIG. 6, the waveguide 200 comprises a depressed cladding region 208''' extending from the radius $r_{2'''}$ to the radius $r_{3'''}$ such that the depressed cladding region 208''' has a radial thickness $t_{3'''}=r_{3'''}-r_{2'''}$. Without wishing to be bound by theory, it is believed that the value of $r_{3'''}$ (and hence the radial thickness $t_{3'''}$ of the depressed cladding region 208''') in part determines a zero dispersion wavelength of the waveguide 200. In embodiments, each the waveguide 200 has a zero dispersion wavelength of greater than or equal 1300 nm and less than or equal to 1324 nm. To achieve such a zero dispersion wavelength and/or other advantages (e.g. low bend loss and/or low cross-talk), $r_{3'''}$ may be greater than or equal to 11 µm and less than or equal to 20 µm. In embodiments, $r_{3'''}$ may be greater than or equal to 12 µm and less than or equal to 18 µm. In embodiments, $r_{3'''}$ may be greater than or equal to 14 µm and less than or equal to 16 µm.

The depressed cladding region 208''' has a relative refractive index $\Delta_{3'''}$. In embodiments, the relative refractive index $\Delta_{3'''}$ is less than or equal to the relative refractive index $\Delta_{2'''}$ of the inner cladding region 206' throughout the depressed cladding region 208'''. The relative refractive index $\Delta_3$ may also be less than or equal to the relative refractive index $\Delta_4$ of the common cladding 20 (see FIG. 1) such that the depressed cladding region 208''' forms a trench in the relative refractive index profile of the waveguide 200. In embodiments, the depressed cladding region 208''' comprises a trench volume $V_T$ of less than or equal to $-30\%\mu m^2$ (e.g., less than or equal to $-30\%\mu m^2$ and greater than or equal to $-70\%\mu m^2$, less than or equal to $-30\%\mu m^2$ and greater than or equal to $-60\%\mu m^2$, less than or equal to $-40\%\mu m^2$ and greater than or equal to $-60\%\mu m^2$).

In comparing the relative refractive index profiles depicted in FIGS. 5 and 6, $r_{3'''}$ of the depressed cladding region 208''' is less than $r_{3''}$ of the depressed cladding region 208'', while $\Delta_{3min'''}$ of the depressed cladding region 208''' is less than $\Delta_{3min''}$ of the depressed cladding region 208'', such that the depressed cladding regions 208'' and 208''' comprise comparable trench volumes. Referring to FIG. 1, incorporating the relative refractive index profile depicted in FIG. 6 into each of the first and second waveguides 16 and 18 may facilitate providing a waveguide-to-waveguide separation distance 29 less than when the relative refractive index profiles of the first and second waveguides 16 and 18 comprise larger values for $r_3$ (such as in the embodiment depicted in FIG. 5). In embodiments where both the first and second waveguides 16 and 18 comprise a depressed cladding region, the relative refractive index profile depicted in FIG. 6 may be preferable over the relative refractive index profile depicted in FIG. 5, as the relative refractive index depicted in FIG. 6 may facilitate the waveguide-to-waveguide separation distance 29 being less than or equal to 40.0 µm (e.g., less than or equal to 38.0 µm, less than or equal to 36.0 µm, less than or equal to 35.0 µm) while still including depressed cladding regions in both the first and second waveguides 16 and 18 to reduce cross-talk between the first and second waveguides 16 and 18. Such a structure, by providing a waveguide-to-waveguide separation distance of less than or equal to 40.0 µm, may facilitate maintaining the waveguide edge to glass edge distance 30 (see FIG. 1) above 5.0 µm to suppress leakage losses.

Embodiments are also envisioned where only one of the first and second waveguides 16 and 18 include a depressed cladding region (such as the depressed cladding region 208'' of FIG. 5 or the depressed cladding region 208''' of FIG. 6).

For example, embodiments are envisioned where one of the first and second waveguides 16 and 18 comprises the depressed cladding region 208" depicted in FIG. 5, while the other one of the first and second waveguides 16 and 18 comprises only an inner cladding region (such as the inner cladding region 206" depicted in FIG. 5) and omits a depressed cladding region. That is, the dual-core fiber 10 depicted in FIG. 1 may have an asymmetrical structure where the first and second waveguides 16 and 18 comprise different components (e.g. core regions and/or cladding regions that differ in size or composition) and/or different refractive index profiles. Such an asymmetrical structure may aid in reducing the waveguide-to-waveguide separation distance 29, while still maintaining cross-talk between the waveguides at less than or equal to −30 dB.

Figure 7:
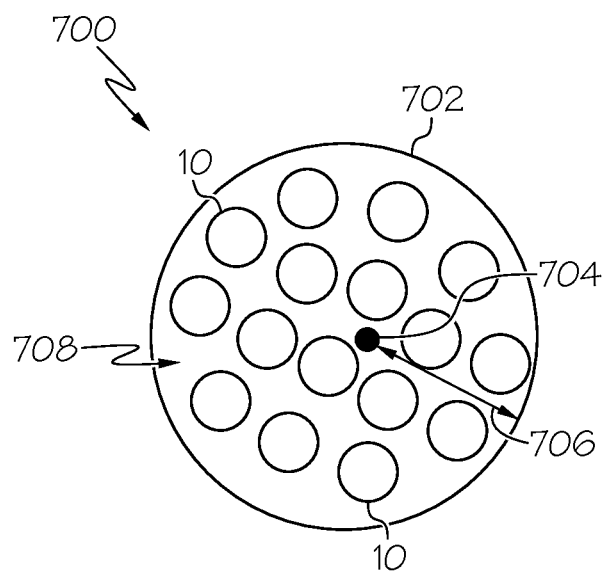
FIG. 7 schematically depicts a cross-sectional view of an optical fiber cable comprising a plurality of dual-core optical fibers, according to one or more embodiments described herein.

With reference to FIG. 7, one application of the dual-core optical fibers described herein is optical fiber cables. FIG. 7 depicts an example optical fiber cable 700 comprising a tubular jacket 702. The tubular jacket 702 is substantially cylindrical shaped and comprises a centerline 704 and an inner diameter 706. Sixteen of the dual-core optical fibers 10 described herein with respect to FIG. 1, including an outer diameter (e.g., corresponding to $2*R_6$) of e.g. 165 µm, are disposed inside of the tubular jacket 702. It has been determined from the mathematical theory of packing circles within circles that the minimum value for the inner radius 706 of a cylindrical optical fiber cable 700 comprising 16 cylindrical optical fibers, each with outer radius $R_6$, is 9.58 $R_6$, or approximately $10*R_6$. In embodiments, however, it is beneficial to maintain a fiber fill fraction, $\phi_f$, defined as a percentage of the cross-sectional area 708 defined by the radius 706 of the tubular jacket 702 through which the dual-core optical fibers 10 may extend, often less than or equal to 50%, to provide adequate clearance to facilitate bending of the optical fiber cable 700. Accordingly, a minimum value of the inner radius 706 to incorporate sixteen of the dual-core optical fibers 10 may be approximately $(10*R_6)/\phi_f$, $20*R_6$. The relative core density is then:

$$\rho_{core} = \frac{(16 \text{ fibers})\left(N\frac{\text{cores}}{\text{fiber}}\right)}{\pi(10 R_6/\phi_f)^2} \tag{10}$$

Given that each of the plurality of dual-core optical fibers 10 comprises two waveguides, as opposed to existing single core designs, such an inner diameter achieves a core density—defined by the number of waveguides per mm² within the optical fiber cable 700—of 3.74 waveguides/mm², when the fiber fill fraction is equal to 50%. Results of a similar computation for other optical fibers are summarized in table 1 below.

TABLE 1

| Waveguide Diameter/Coating Diameter | Number of Cores per Fiber | Cladding Diameter (microns) | Coating Diameter (microns) | Core Density in 16-fiber Tube (mm$^{-2}$) |
| --- | --- | --- | --- | --- |
| 125/250 µm SMF | 1 | 125 | 250 | 0.81 |
| 125/200 µm SMF | 1 | 125 | 200 | 1.27 |
| 80/165 µm RCF | 1 | 80 | 165 | 1.87 |
| 80/165 µm DCF | 2 | 80 | 165 | 3.74 |

In Tables 1 and 2, "SMF" refers to a single mode fiber, "RCF" refers to a reduced clad single mode fiber, and "DCF" refers to a reduced clad dual-core single mode fiber, where "single mode" means at a wavelength of 1550 nm. As shown, the reduced cladding dual-core optical fibers described herein more than quadruple the core density within a 16 fiber optical cable when compared to a standard 125/250 µm single mode optical fiber. The dual-core optical fibers described herein may provide a core density of greater than 3.0 waveguides/mm² when arranged in a tube-shaped optical fiber cable with a fiber fill fraction that is greater or equal to 50%. This increase in core density either allows for reducing a size of an optical fiber cable at a given fill fraction to transmit the same number of channels, or to deploy the same-sized optical fiber cable at a given fill fraction while increasing the number of channels transmitted. The increased core density provided by the dual-core optical fibers described herein may also facilitate chip-scale interconnections to improve densities of optical input and output connections for photonic chips.

Figure 8A:
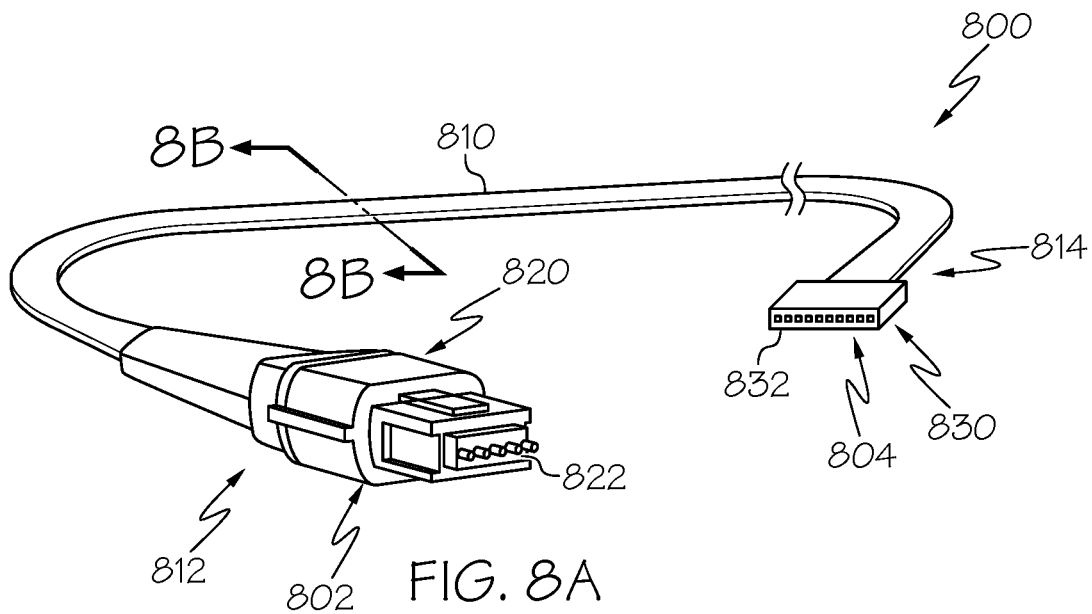
FIG. 8A schematically depicts an optical fiber interconnect comprising a ribbon cable with a plurality of dual-core optical fibers extending therethrough, according to one or more embodiments described herein.

FIG. 8A schematically depicts an optical fiber interconnect 800, according to an example embodiment. The optical fiber interconnect 800 comprises a first end 802 and a second end 804. A ribbon cable 810 extends between the first end 802 and the second end 804. The ribbon cable 810 comprises a first cable end 812 disposed proximate the first end 802 and a second cable end 814 disposed proximate the second end 804.

Figure 8B:
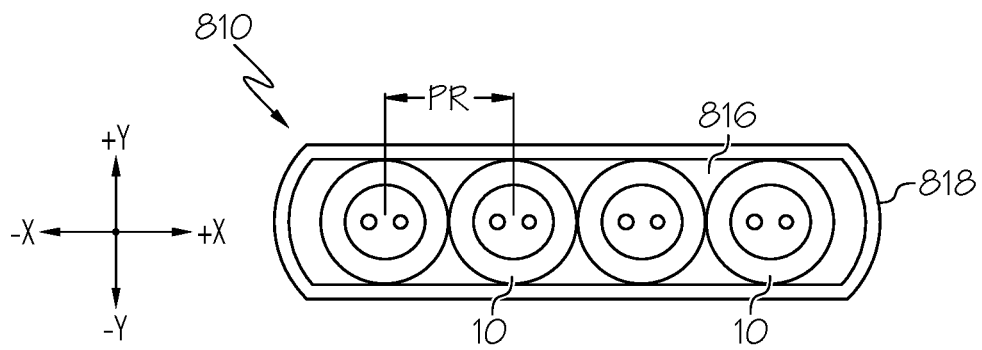
FIG. 8B schematically depicts a cross-sectional view of the ribbon cable through the line 8-8 of FIG. 8A, according to one or more embodiments described herein.

FIG. 8B schematically depicts a cross-sectional view of the ribbon cable 810 through the line 8-8 of FIG. 8A. The ribbon cable 810 comprises a plurality of the dual-core optical fibers 10 described herein with respect to FIG. 1. In the depicted embodiment, the plurality of dual-core optical fibers 10 are arranged in a single row, though other arrangements are contemplated and within the scope of the present disclosure. For example, in embodiments, the ribbon cable 810 comprises a plurality of rows of dual-core optical fibers, with each row containing the same number of dual-core optical fibers (e.g., 4 optical fiber, 8 optical fibers, etc.). It should be understood that the dual-core optical fibers of the present disclosure may be incorporated into optical fiber cables including a wide variety of arrangements of optical fibers. While the ribbon cable 810 is depicted to include only four dual-core optical fibers 10, embodiments are envisioned where the ribbon cable 810 comprises 8 or more dual-core optical fibers arranged in a single row. The dual-core optical fibers of the present disclosure may be incorporated into any of the cable/ribbon arrangements described in U.S. Pat. No. 10,816,743, hereby incorporated by reference in its entirety.

The plurality of dual-core optical fibers 10 are depicted to be encapsulated within a matrix layer 816 that may serve to bind the plurality of dual-core optical fibers 10. In embodiments, the matrix layer 816 is constructed such that portions of the plurality of dual-core optical fibers 10 are exposed (e.g., such as portions of the dual-core optical fibers 10 proximate to the first cable end 812 and the second cable end 814 to facilitate manipulation of the fibers at points of interconnection with external components). In embodiments, one or more protective layers 818 circumferentially surrounds the matrix layer 816 to protect the plurality of dual-core optical fibers 10 from environmental conditions and physical wear and tear. In embodiments, the ribbon cable 810 comprises a plurality of fiber ribbons (e.g., each ribbon being comprised of a row of the dual-core optical fibers 10 encapsulated within a matrix layer similar in structure to the matrix layer 816 depicted in FIG. 8B) stacked on top of one another.

As depicted in FIG. 8B, within the ribbon cable 810, the plurality of dual-core optical fibers 10 are arranged with a pitch PR. The pitch PR may measure a distance between the longitudinal centerlines 22 (see FIG. 1) of adjacent ones of the plurality of dual-core-optical fibers 10 in a direction along which the row of fibers extends (e.g., the +/−X direction depicted in FIG. 8B). In embodiments, the pitch PR is greater than or equal to 2*$R_6$ (see FIG. 1). In embodiments, the pitch PR is less than or equal to 180 μm, or less than or equal to 175 μm, or less than or equal to 170 μm, or less than or equal to 165 μm, or less than or equal to 160 μm. As such, the reduced-cladding dual-core optical fibers described herein facilitate the pitch PR being reduced as compared to ribbon cables including existing 125/250 μm single mode optical fibers, thereby aiding in reducing the size of the ribbon cable 810 while maintaining high fiber count.

Figure 8C:
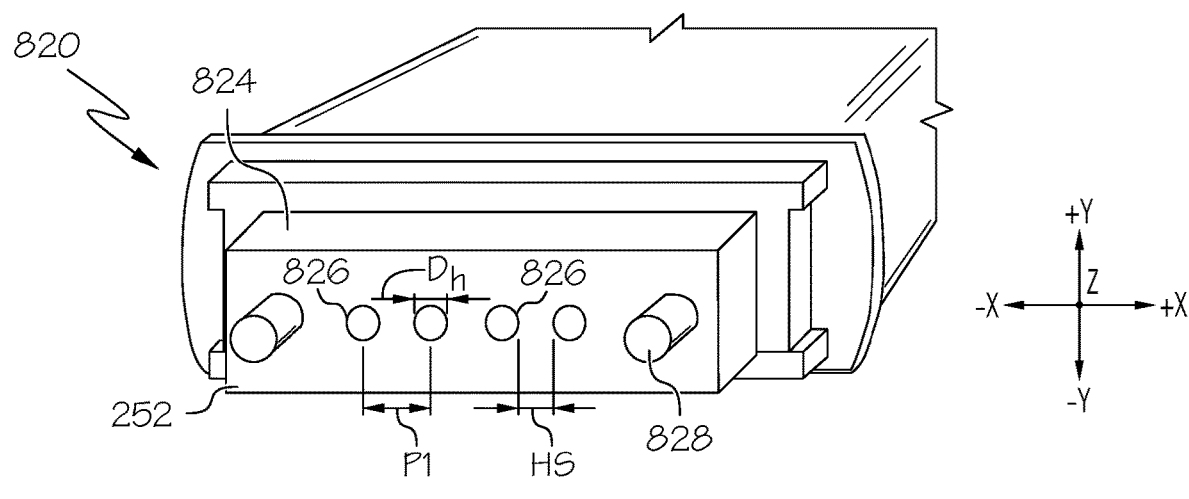
FIG. 8C schematically depicts a first optical fiber connector disposed at a first end of the optical fiber interconnect of FIG. 8A, according to one or more embodiments described herein.

Referring again to FIG. 8A, the first cable end 812 of the ribbon cable 810 may terminate at a first optical fiber connector 820, which defines the first cable end 812 of the optical fiber interconnect 800. The first optical fiber connector 820 comprises a first end face 822 at which the optical fiber interconnect 800 may be connected to another component in a system (e.g., another optical fiber cable). In embodiments, the first optical fiber connector 820 comprises a multi-fiber push-on ("MPO") connector. For example, as depicted in FIG. 8C, the first optical fiber connector 820 may comprise a ferrule 824 comprising a plurality of axial holes 826 extending therethrough. The ferrule 824 may also include one or more alignment features 828 configured to engage with corresponding features of other connectors to facilitate alignment and optical coupling between optical fibers in adjacent components.

In embodiments, the plurality of axial holes 826 each extend parallel to one another and comprise a diameter Dn. In embodiments, the diameter $D_h$ of the plurality of axial holes 826 may be sized to accommodate the glass portions 12 of the plurality of dual-core optical fibers 10 of the ribbon cable 810 (see FIGS. 8A and 8B). In embodiments, the diameter $D_h$ is less than or equal to 100 μm (e.g., less than or equal to 95.0 μm, less than or equal to 90.0 μm, less than or equal to 85.0 μm, less than or equal to 80.0 μm).

In embodiments, centerlines of each of the plurality of axial holes 826 are separated from one another by a pitch P1. In embodiments, the pitch P1 is less than or equal to 180 μm, or less than or equal to 175 μm, or less than or equal to 170 μm, or less than or equal to 165 μm, or less than or equal to 160 μm.

Figure 8D:
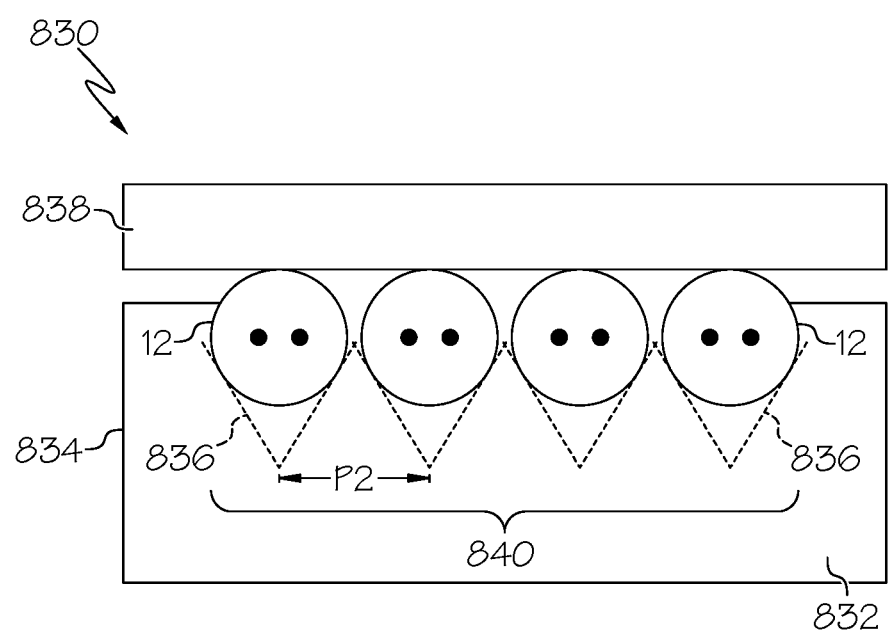
FIG. 8D schematically depicts a second optical fiber connector disposed at a second end of the optical fiber interconnect of FIG. 8A, according to one or more embodiments described herein.

Referring again to FIG. 8A, the optical fiber interconnect 800 comprises a second optical fiber connector 830 attached to the second cable end 814 of the ribbon cable 810. In embodiments, the second optical fiber connector 830 is a fiber array unit comprising an end face 832. The second optical fiber connector 830 may be used to couple the plurality of dual-core optical fibers 10 of the ribbon cable 810 (see FIG. 8B) to a photonic chip (e.g., containing a photonic circuit). FIG. 8D depicts an example embodiment of the second optical fiber connector 830. The second optical fiber connector 830 is depicted to include a grooved substrate 834 comprising a plurality of v-shaped grooves 836. The plurality of v-shaped grooves 836 may be sized to retain at least portions of one of the plurality of dual-core optical fibers 10 of the ribbon cable 810 (see FIG. 8B). For example, in the depicted embodiment, glass portions 12 of the plurality of dual-core optical fibers 10 are retained in the plurality of v-shaped grooves 836 (e.g., end portions of the plurality of dual-core optical fibers 10 proximate to the second cable end 814 (see FIG. 8A) may be stripped of the coating portions 14 thereof to facilitate connection to the second optical fiber connector 830). In embodiments, to secure the glass portions 12 of the plurality of dual-core optical fibers 10 in the grooved substrate 834, each one of the glass portions 12 is placed in one of the plurality of v-shaped grooves 836. A bonding agent (e.g., epoxy, not depicted) may be applied over the glass portions 12. Subsequently, a cover glass 838 may be placed over the glass portions 12 to secure the glass portions 12 in the plurality of v-shaped grooves 836 via the bonding agent. The structure of fiber array units is described in greater detail in U.S. Pat. No. 10,816,743, hereby incorporated by reference in its entirety.

Centers of successive ones of the plurality of v-shaped grooves 836 are separated from one another by a pitch P2. In embodiments, the pitch P2 is less than or equal to 2*$R_6$. In embodiments, the pitch P2 is greater than 2*$R_4$. In embodiments, the pitch P2 is greater than 2*$R_4$ and less than 2*$R_6$. In embodiments, the pitch P2 is greater than 2*$R_4$ and less than 2.1*$R_4$. In embodiments, the pitch P2 is greater than 2*$R_4$ and less than 2.05*$R_4$.

In these embodiments, the core density is the number of cores divided by the cross-sectional area occupied by the optical fibers. In embodiments with N single-core fibers connectorized at pitch P2=2*$R_6$, the cross sectional area is (2*N*$R_6$)*(2*$R_6$), and the core density is 1/(2*$R_6$)$^2$. In embodiments with N dual-core fibers connectorized at pitch P2=2*$R_6$, the cross sectional area is (2*N*$R_6$)*(2*$R_6$), and the core density is 2/(2*$R_6$)$^2$. In embodiments with N single-core fibers connectorized at pitch P2=2.05*$R_4$, the cross sectional area is (2.05*N*$R_4$)*(2*$R_6$), and the core density is 1/(2*$R_6$)/(2.05*N*$R_4$). In embodiments with N single-core fibers connectorized at pitch P2=2.05*$R_4$, the cross sectional area is (2.05*N*$R_4$)*(2*$R_6$), and the core density is 1/(2*$R_6$)/(2.05*N*$R_4$).

A plurality of examples for 48 channel fiber array units (e.g., carried by either 48 single mode fibers or 24 dual-core optical fibers) are described in Table 2 below for various fiber geometries (e.g., standard 125/250 μm single mode fibers, 80/165 μm reduced clad single mode fibers, 80/165 μm reduced clad dual-core optical fibers, both interleaved and not interleaved).

TABLE 2

| Waveguide Diameter/Coating Diameter | Number of Cores per Fiber | Cladding Radius (microns) | Coating Radius (microns) | Pitch P2 (microns) | Core Density (waveguides/mm$^2$) |
| --- | --- | --- | --- | --- | --- |
| Standard 125/250 μm SMF | 1 | 62.5 | 125 | 250 | 16 |
| Standard 125/250 μm SMF, interleaved | 1 | 62.5 | 125 | 127 | 31.5 |
| 80/165 μm RCF | 1 | 40 | 82.5 | 165 | 36.7 |
| 80/165 μm RCF, Interleaved | 1 | 40 | 82.5 | 84 | 72.2 |
| 80/165 μm 2-core | 2 | 40 | 82.5 | 165 | 73.5 |

TABLE 2-continued

| Waveguide Diameter/Coating Diameter | Number of Cores per Fiber | Cladding Radius (microns) | Coating Radius (microns) | Pitch P2 (microns) | Core Density (waveguides/mm²) |
|---|---|---|---|---|---|
| DCF 80/165 μm 2-core DCF, Interleaved | 2 | 40 | 82.5 | 84 | 144.3 |

As shown, the dual-core optical fibers described herein facilitate more than an eightfold increase in linear core density in fiber array units as compared to standard 125/250 μm single mode fibers. Such density may facilitate reducing the footprints of fiber array units while maintaining the number of channels, thereby increasing the number of fiber-chip connections for photonic circuits.

EXAMPLES

The embodiments described herein will be further clarified by the following examples.

Waveguide Examples

Four waveguide designs (Example A-Example D) were mathematically modeled to determine the optical properties of the waveguides. The waveguide of Example A was modeled to possess the relative refractive index profile depicted in FIG. 3. The waveguide of Example B was modelled to possess the relative refractive index profile depicted in FIG. 4. The waveguide of Example C was modelled to possess the relative refractive index profile depicted in FIG. 5. The waveguide of Example D was modeled to possess the relative refractive index profile depicted in FIG. 6. The structure and optical properties of the optical fibers of Examples A-D are set forth in Table 3.

TABLE 3

| Parameter | Example A | Example B | Example C | Example D |
|---|---|---|---|---|
| $\Delta_{1max}$ (%) | 0.34 | 0.33 | 0.38 | 0.38 |
| $r_1$ (microns) | 4.4 | 4.3 | 5.3 | 5.3 |
| Alpha Value | 20 | 20 | 2.8 | 2.8 |
| $\Delta_2$ (%) | 0 | 0 | 0 | 0 |
| $r_2$ (microns) | 13.3 | 12.5 | 10 | 9.5 |
| $t_2$ (microns) | 8.9 | 8.2 | 4.7 | 4.2 |
| $\Delta_{3min}$ (microns) | −0.4 | −0.6 | −0.4 | −0.6 |
| $r_3$ (microns) | 17.3 | 15.5 | 15 | 12.5 |
| $t_3$ (microns) | 4 | 3 | 5 | 3 |
| $V_T$ (%-sq. microns) | −49.0 | −50.4 | −50.0 | −39.6 |
| $\Delta_4$ (%) | 0 | 0 | 0 | 0 |
| R4 (microns) | 40 | 40 | 40 | 40 |
| R5 (microns) | 60 | 62.5 | 62.5 | 65 |
| R6 (microns) | 75 | 82.5 | 77.5 | 82.5 |
| MFD at 1310 nm (microns) | 9.13 | 9.19 | 9.04 | 8.98 |
| MFD at 1550 nm (microns) | 10.36 | 10.44 | 10.18 | 10.04 |
| Aeff at 1310 nm (sq. microns) | 65.4 | 66.0 | 62.7 | 62.1 |
| Aeff at 1550 nm (sq. microns) | 82.0 | 83.1 | 78.5 | 76.8 |
| Dispersion at 1310 nm (ps/nm/km) | 0.02 | −0.13 | 0.06 | 0.53 |
| Dispersion at 1550 nm (ps/nm/km) | 17.18 | 17.34 | 18.34 | 19.04 |
| Dispersion Slope at 1310 nm (ps/nm²/km) | 0.087 | 0.088 | 0.092 | 0.093 |
| Zero Dispersion Wavelength (nm) | 1309.8 | 1311.5 | 1309.3 | 1304.3 |
| Cable Cutoff Wavelength (nm) | 1255 | 1210 | 1220 | 1212 |
| Effective Group Refractive Index at 1310 nm | 1.4671 | 1.4669 | 1.4672 | 1.4672 |
| Effective Group Refractive Index at 1490 nm | 1.4675 | 1.4673 | 1.4676 | 1.4676 |
| Effective Group Refractive Index at 1550 nm | 1.4678 | 1.4676 | 1.4679 | 1.4680 |

As shown in Examples A, B, C, and D, the dual-core optical fibers described herein are trench-assisted, which improves the confinement of the signal in the core regions and facilitates the suppression of cross-talk. The dual-core optical fibers described herein are capable of achieving an effective area $A_{eff}$ at 1310 nm for each waveguide of greater than or equal to 60 μm² and less than or equal to 68 μm². The dual-core optical fibers described herein also demonstrate a mode field diameter at 1310 nm of greater than or equal to 8.6 μm and less than or equal to 9.5 μm (e.g., greater than or equal to 8.7 μm and less than or equal to 9.3 μm, greater than or equal to 8.9 μm and less than or equal to 9.4 μm) to facilitate coupling with a standard single mode fibers. The dual-core optical fibers described herein also demonstrate a zero dispersion wavelength that is greater than or equal to 1300 nm and less than or equal to 1324 nm, and the magnitude of the dispersion at 1310 nm may be less than or equal to 0.5 ps/nm/km. The dual-core optical fibers described herein may also demonstrate a cable cutoff wavelength of less than or equal to 1260 nm (e.g., less than or equal to 1240 nm, less than or equal to 1220 nm), demonstrating capacity of the waveguides herein for single mode transmission. The effective group indices of the dual-core optical fibers described herein have values of about 1.467, 1.4675, and 1.468 at wavelengths of 1310 nm, 1490 nm and 1550 nm, respectively.

Dual-Core Optical Fiber Examples

Six dual-core optical fiber designs (Example 1-Example 6) were mathematically modeled to determine the optical properties of the fibers. Each of the dual optical fibers was modeled to include the general structure of the dual-core optical fiber 10 described herein with respect to FIG. 1, with the first and second waveguides 16 and 18 being symmetrically arranged on either side of the longitudinal centerline 22 of the common cladding 20 (or fiber) and possessing the general structure of the waveguide 200 described herein with respect to FIG. 2 (e.g., including a core region 202, an inner cladding region 206, and a depressed cladding region 208). The structure and optical properties of the dual-core optical fibers of Examples 1-6 are set forth in Table 4.

TABLE 4

| Parameter | Example 1 | Example 2 | Example 3 | Example 4 | Example 5 | Example 6 |
|---|---|---|---|---|---|---|
| $R_4$ (microns) | 40 | 40 | 40 | 40 | 40 | 40 |
| $r_3$ (microns) | 12.5 | 12.5 | 12.5 | 14 | 14 | 15 |
| Minimum Waveguide edge to Glass Edge Distance (microns) | 10 | 8 | 6 | 8 | 6 | 6 |
| Distance from Core Longitudinal Centerline to Centerline of Fiber (microns) | 17.5 | 19.5 | 21.5 | 18 | 20 | 19 |
| Waveguide-to-waveguide Separation Distance (microns) | 35 | 39 | 43 | 36 | 40 | 38 |
| Nearest Neighbour Xtalk at 1310 nm (dB) | −53.9 | −67.5 | −81.2 | −57.3 | −70.9 | −64.1 |
| Nearest Neighbour Xtalk at 1490 nm (dB) | −32.0 | −43.2 | −54.4 | −34.8 | −46.0 | −40.4 |
| Nearest Neighbour Xtalk at 1550 nm (dB) | −25.4 | −35.9 | −46.3 | −28.0 | −38.5 | −33.3 |
| $R_5$ (microns) | 62.5 | 62.5 | 62.5 | 62.5 | 62.5 | 62.5 |
| $R_6$ (microns) | 82.5 | 82.5 | 82.5 | 82.5 | 82.5 | 82.5 |

For the dual-core optical fibers of Examples 1-6, which each included core regions with effective group refractive indices of about 1.467, 1.4675 and 1.468 at wavelengths of 1310 nm, 1490 nm and 1550 nm, respectively, the average crosstalk is given by $$h \approx \kappa^2 \frac{\lambda R_b}{\pi n_{\mathit{eff}} R_{12}} \quad (12)$$

where κ is the mode-coupling coefficient, λ is the wavelength, $R_b$ is the effective bend radius, and $n_{\mathit{eff}}$ is the effective group refractive index at wavelength λ. For an effective bend radius of 1 m, which is a reasonable assumption for many optical fiber cables, the average cross-talk between the waveguides at 1310 nm, 1490 nm, and 1550 nm may be respectively computed using the following equations (13, 14, 15):

$$X_{1310} = 65.46 - 3.41 * R_{12}; \quad (13)$$

$$X_{1490} = 66.04 - 2.80 * R_{12}; \quad (14)$$

$$X_{1550} = 65.93 - 2.61 * R_{12}, \quad (15)$$

where $R_{12}$ represents the waveguide-to-waveguide separation distance between the waveguides (e.g., corresponding to the waveguide-to-waveguide separation distance 29 depicted in FIG. 1). In embodiments, the average crosstalk between adjacent waveguides in the dual-core optical fibers described herein is less than or equal to −20 dB, or less than or equal to −30 dB, or less than or equal to −35 dB, or less than or equal to −40 dB, or less than or equal to −45 dB, or less than or equal to −50 dB, or less than or equal to −55 dB, or less than or equal to −60 dB, as measured for a 100 km length of the dual-core optical fiber operating at 1550 nm. In embodiments, the average crosstalk between the waveguides in the dual-core optical fibers described herein is less than or equal to −20 dB, or less than or equal to −30 dB, or less than or equal to −35 dB, or less than or equal to −40 dB, or less than or equal to −45 dB, or less than or equal to −50 dB, or less than or equal to −55 dB, or less than or equal to −60 dB, as measured for a 100 km length of the dual-core optical fiber operating at 1490 nm. In embodiments, the average crosstalk between the waveguides in the dual-core optical fibers described herein is less than or equal to −20 dB, or less than or equal to −30 dB, or less than or equal to −35 dB, or less than or equal to −40 dB, or less than or equal to 45 dB, or less than or equal to −50 dB, or less than or equal to −55 dB, or less than or equal to −60 dB, as measured for a 100 km length of the dual-core optical fiber operating at 1310 nm.

In view of the foregoing description, it should be understood that reduced-cladding dual-core optical fibers for incorporation into optical fiber interconnects and optical fiber cables have been shown and described. The dual-core optical fibers of the present disclosure comprise a first waveguide and a second waveguide extending through a common cladding. The common cladding may have a radius that is less than or equal to 45 µm, and longitudinal centerlines of the waveguides may be separated by a waveguide-to-waveguide separation distance that is greater than or equal to 30 µm. One or more of the waveguides may include an inner cladding region and a depressed cladding region, such that the cross-talk between the waveguides is less than or equal to −30 dB at 1310 nm, as measured over a length of 100 km of optical fiber. The reduced-cladding size and low cross-talk of the dual-core optical fibers described herein improves connection density as compared to standard 125/250 single mode fibers, while the low cross-talk facilitates use over long-haul transmission. The dual-core optical fibers described herein may beneficially reduce the footprint of interconnections while maintaining or even increasing channel density in fiber-to-fiber interconnections and fiber-to-chip interconnections.

Unless otherwise expressly stated, it is in no way intended that any method set forth herein be construed as requiring that its steps be performed in a specific order, nor that with any apparatus specific orientations be required. Accordingly, where a method claim does not actually recite an order to be followed by its steps, or that any apparatus claim does not actually recite an order or orientation to individual components, or it is not otherwise specifically stated in the claims or description that the steps are to be limited to a specific order, or that a specific order or orientation to components of an apparatus is not recited, it is in no way intended that an order or orientation be inferred, in any respect. This holds for any possible non-express basis for interpretation, including: matters of logic with respect to arrangement of steps, operational flow, order of components, or orientation of components; plain meaning derived from grammatical organization or punctuation, and; the number or type of embodiments described in the specification.

It will be apparent to those skilled in the art that various modifications and variations can be made to the embodiments described herein without departing from the spirit and scope of the claimed subject matter. Thus, it is intended that the specification cover the modifications and variations of the various embodiments described herein provided such modification and variations come within the scope of the appended claims and their equivalents.

What is claimed is:

1. A dual-core optical fiber comprising:
   a first waveguide comprising a first core longitudinal centerline;
   a second waveguide comprising a second core longitudinal centerline; and
   a common cladding through which the first and second waveguides extend, the common cladding comprising a longitudinal centerline and an outer radius $R_4$ that is less than or equal to 45 µm, wherein:
     the first core longitudinal centerline and the second core longitudinal centerline are separated from one another by a waveguide-to-waveguide separation distance that is greater than or equal to 30 µm, and
     a cross-talk between the first and second waveguides is less than or equal to −40 dB at 1310 nm, as measured over a length of 100 km of the dual-core optical fiber.

2. The dual-core optical fiber of claim 1, wherein:
   the first waveguide and the second waveguide each comprise a core region comprising a radius $r_1$, a relative refractive index $\Delta_1$, and an alpha value, and
   at least one of the first waveguide and the second waveguide comprises a depressed cladding region comprising a radius $r_3$ and a relative refractive index $\Delta_3$ circumferentially surrounding the core region.

3. The dual-core optical fiber of claim 2, wherein the alpha value of each of the first waveguide and the second waveguide is between 6 and 12.

4. The dual-core optical fiber of claim 2, wherein the radius $r_3$ of the depressed cladding region of the at least one of the first waveguide and the second waveguide is less than or equal to $0.9*R_4/2$.

5. The dual-core optical fiber of claim 2, wherein the radius $r_3$ of the depressed cladding region of the at least one of the first waveguide and the second waveguide is less than or equal to $0.8*R_4/2$.

6. The dual-core optical fiber of claim 2, wherein the depressed cladding region of the at least one of the first waveguide and the second waveguide comprises a trench volume that is greater than or equal to −70%µm² and less than or equal to −30%µm².

7. The dual-core optical fiber of claim 2, wherein the relative refractive index $\Delta_1$ of the core region of each of the first waveguide and the second waveguide comprises a maximum value $\Delta_{1max}$ that is greater than or equal to 0.32 $\Delta$% and less than or equal to 0.36 $\Delta$%.

8. The dual-core optical fiber of claim 2, wherein the first waveguide and the second waveguide each comprise an inner cladding region circumferentially surrounding and contacting the core region, the inner cladding region comprising a radius $r_2$ and a relative refractive index $\Delta_2$ that is greater than or equal to −0.05 $\Delta$% and less than or equal to 0.05 $\Delta$%, and wherein the first waveguide comprises the depressed cladding region, the depressed cladding region of the first waveguide circumferentially surrounding and contacting the inner cladding region of the first waveguide.

9. The dual-core optical fiber of claim 8, wherein the second waveguide comprises the depressed cladding region, the depressed cladding region of the second waveguide circumferentially surrounding and contacting the inner cladding region of the second waveguide.

10. The dual-core optical fiber of claim 8, wherein:
    the radius $r_1$ of the core region of each of the first waveguide and the second waveguide is greater than or equal to 4 µm and less than or equal to 5 µm; and
    a radial thickness $t_2$ of the inner cladding region of each of the first waveguide and the second waveguide is greater than or equal to 6 µm and less than or equal to 10 µm.

11. The dual-core optical fiber of claim 10, wherein the depressed cladding region of at least one of the first waveguide and the second waveguide comprises a radial thickness $t_3$ that is greater than or equal to 2 µm and less than or equal to 6 µm.

12. The dual-core optical fiber of claim 2, wherein the alpha value of each of the first waveguide and the second waveguide is less than or equal to 6.

13. The dual-core optical fiber of claim 12, wherein the relative refractive index $\Delta_1$ of the core region of each of the first waveguide and the second waveguide comprises a maximum value $\Delta_{1max}$ that is greater than or equal to 0.36 $\Delta$% and less than or equal to 0.4 $\Delta$%.

14. The dual-core optical fiber of claim 13, wherein the first waveguide and the second waveguide each comprise an inner cladding region circumferentially surrounding and contacting the core region, the inner cladding region comprising a radius $r_2$ and a relative refractive index $\Delta_2$ that is greater than or equal to −0.05 $\Delta$% and less than or equal to 0.05 $\Delta$%; and
    wherein the first waveguide comprises the depressed cladding region, the depressed cladding region of the first waveguide circumferentially surrounding and contacting the inner cladding region of the first waveguide.

15. The dual-core optical fiber of claim 14, wherein the second waveguide comprises the depressed cladding region, the depressed cladding region of the second waveguide circumferentially surrounding and contacting the inner cladding region of the second waveguide.

16. The dual-core optical fiber of claim 14, wherein:
    the radius $r_1$ of the core region of each of the first waveguide and the second waveguide is greater than or equal to 4.8 µm and less than or equal to 5.8 µm; and
    a radial thickness $t_2$ of the inner cladding region of each of the first waveguide and the second waveguide is greater than or equal to 6 µm and less than or equal to 10 µm.

17. The dual-core optical fiber of claim 16, wherein the depressed cladding region comprises a trench volume that is greater than or equal to −70%µm² and less than or equal to −30%µm².

18. The dual-core optical fiber of claim 1, wherein the first waveguide and the second waveguide comprise mode field diameters at 1310 nm that are greater than or equal to 8.6 μm and less than or equal to 9.5 μm.

19. The dual-core optical fiber of claim 1, further comprising an inner coating circumferentially surrounding and contacting the common cladding and an outer coating circumferentially surrounding and contacting the inner coating, wherein the outer coating comprises a radius $R_6$ that is less than or equal to 82.5 μm.

20. The dual-core optical fiber of claim 1, wherein the waveguide-to-waveguide separation distance is greater than or equal to 30 μm and less than or equal to 45 μm.

21. The dual-core optical fiber of claim 20, wherein only one of the first waveguide and the second waveguide comprises a depressed cladding region with a relative refractive index $\Delta_3$ that is less than a relative refractive index $\Delta_4$ of the common cladding.

22. An optical fiber cable comprising:
   a plurality of dual-core optical fibers arranged in one or more rows, wherein each dual-core optical fiber comprises:
      a glass portion comprising a common cladding through which a first waveguide and a second waveguide extend, the common cladding having a longitudinal centerline and a radius $R_4$ that is less than or equal to 45 μm, the first waveguide comprising a core region and a first core longitudinal centerline, the second waveguide comprising a core region and a second core longitudinal centerline, wherein the first core longitudinal centerline and the second core longitudinal centerline are separated from one another by a waveguide-to-waveguide separation distance that is greater than or equal to 30 μm; and
      a coating portion that surrounds and contacts the glass portion and comprises a radius $R_6$ that is less than or equal to 82.5 μm; and
   a matrix layer encapsulating the plurality of dual-core optical fibers,
   wherein:
      the plurality of dual-core optical fibers are arranged such that the longitudinal centerlines of the common cladding of each of the plurality of dual-core optical fibers are separated by a pitch PR that is less than or equal to 175 μm; and
      a cross-talk between the first and second waveguides in each of the plurality of dual core optical fibers is less than or equal to −40 dB at 1310 nm, as measured over a length of 100 km of the dual-core optical fiber.

23. An optical fiber interconnect comprising:
   an optical fiber ribbon cable comprising a first end, a second end, and at least one fiber ribbon comprising a plurality of dual-core optical fibers, wherein each dual-core optical fiber comprises:
      a glass portion comprising a common cladding with a radius $R_4$ that is less than or equal to 42 μm, a first waveguide comprising a first core longitudinal centerline, and a second waveguide comprising a second core longitudinal centerline, wherein the first core longitudinal centerline and the second core longitudinal centerline are separated from one another by a waveguide-to-waveguide separation distance that is less than or equal to 36 μm; and
      a coating portion that surrounds and contacts the glass portion and comprises a radius $R_6$ that is less than or equal to 82.5 μm; and
   an optical fiber connector disposed at the first end or the second end, wherein:
      within the optical fiber connector, the plurality of dual-core optical fibers is arranged in one or more rows with a pitch P that is less than or equal to 165 μm.

* * * * *